(12) United States Patent
Dohta et al.

(10) Patent No.: US 8,228,293 B2
(45) Date of Patent: Jul. 24, 2012

(54) REMOTE CONTROL AND SYSTEM AND METHOD USING THE REMOTE CONTROL

(75) Inventors: Takuhiro Dohta, Kyoto (JP); Keizo Ohta, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 640 days.

(21) Appl. No.: 12/365,759

(22) Filed: Feb. 4, 2009

(65) Prior Publication Data

US 2009/0203445 A1 Aug. 13, 2009

Related U.S. Application Data

(62) Division of application No. 11/408,964, filed on Apr. 24, 2006, now Pat. No. 7,833,100.

(30) Foreign Application Priority Data

Sep. 14, 2005 (JP) .................................. 2005-267179

(51) Int. Cl.
G09G 5/08 (2006.01)

(52) U.S. Cl. ......................................... 345/158; 463/47

(58) Field of Classification Search .................... 463/20, 463/38, 40–42, 47; 705/27; 340/425.5; 455/99
See application file for complete search history.

(56) References Cited

U.S. PATENT DOCUMENTS

| | | | |
|---|---|---|---|
| 4,285,523 A | 8/1981 | Lamelson | |
| 5,023,943 A | 6/1991 | Heberle | |
| 5,045,843 A | 9/1991 | Hansen | |
| 5,309,137 A | 5/1994 | Kajiwara | |
| 5,319,387 A | 6/1994 | Yoshikawa | |
| 5,388,059 A | 2/1995 | DeMenthon | |
| 5,510,893 A | 4/1996 | Suzuki | |
| 5,574,479 A | 11/1996 | Odell | |
| 5,581,372 A | 12/1996 | Kerz | |
| 5,608,528 A | 3/1997 | Ogawa | |
| 5,627,565 A * | 5/1997 | Morishita et al. | 345/158 |
| 5,694,495 A | 12/1997 | Hara et al. | |
| 5,736,974 A | 4/1998 | Selker | |
| 5,900,863 A | 5/1999 | Numazaki | |
| 5,986,644 A | 11/1999 | Herder et al. | |

(Continued)

FOREIGN PATENT DOCUMENTS

JP 7-121293 5/1995

(Continued)

OTHER PUBLICATIONS

Machine translation of JP 2005-021563.

(Continued)

*Primary Examiner* — Masud Ahmed
(74) *Attorney, Agent, or Firm* — Nixon & Vanderhye, P.C.

(57) ABSTRACT

Example systems and methods described herein relate to a remote control including an image sensor disposed on a front end portion thereof. First and second markers produced by a light source are detected at the image sensor. A first middle point is calculated based on the detected first and second markers and a second middle point is calculated based on the first middle point and a difference in direction between a reference direction and a direction from the first detected marker to the second detected marker. A position pointed to by the remote control is calculated based on a difference between a reference point and the second middle point. An image signal is generated for an image based at least in part on the pointed-to position.

14 Claims, 26 Drawing Sheets

U.S. PATENT DOCUMENTS

| | | | |
|---|---|---|---|
| 5,999,166 | A | 12/1999 | Rangan |
| 6,008,800 | A | 12/1999 | Pryor |
| 6,045,446 | A | 4/2000 | Ohshima |
| 6,091,378 | A | 7/2000 | Richardson et al. |
| 6,110,039 | A | 8/2000 | Oh |
| 6,146,278 | A | 11/2000 | Kobayashi |
| 6,160,656 | A | 12/2000 | Mossberg et al. |
| 6,244,956 | B1 | 6/2001 | Nakayama et al. |
| 6,251,011 | B1 | 6/2001 | Yamazaki |
| 6,281,878 | B1 | 8/2001 | Montellese |
| 6,324,255 | B1 | 11/2001 | Kondo et al. |
| 6,373,961 | B1 | 4/2002 | Richardson et al. |
| 6,429,856 | B1 | 8/2002 | Omura et al. |
| 6,445,409 | B1 | 9/2002 | Ito et al. |
| 6,515,651 | B1 | 2/2003 | Berstis |
| 6,545,661 | B1 | 4/2003 | Goschy et al. |
| 6,559,935 | B1 | 5/2003 | Tew |
| 6,603,880 | B2 | 8/2003 | Sakamoto |
| 6,641,269 | B2 | 11/2003 | Kitazawa |
| 6,727,887 | B1 | 4/2004 | Levine et al. |
| 6,757,446 | B1 * | 6/2004 | Li et al. .......................... 382/293 |
| 6,765,681 | B1 | 7/2004 | Sweetser et al. |
| 6,781,701 | B1 | 8/2004 | Sweetser et al. |
| 6,847,348 | B2 | 1/2005 | Rojewski |
| 6,890,262 | B2 | 5/2005 | Oishi et al. |
| 6,926,610 | B2 | 8/2005 | Kobayashi et al. |
| 6,956,503 | B2 | 10/2005 | Yokokohji et al. |
| 6,978,037 | B1 | 12/2005 | Fechner et al. |
| 6,982,697 | B2 | 1/2006 | Wilson et al. |
| 7,053,798 | B2 | 5/2006 | Popineau |
| 7,061,468 | B2 | 6/2006 | Tiphane et al. |
| 7,071,908 | B2 | 7/2006 | Guttag et al. |
| 7,095,925 | B2 | 8/2006 | Grunnet-Jepsen et al. |
| 7,102,616 | B1 | 9/2006 | Sleator |
| 7,130,469 | B2 | 10/2006 | Adachi |
| 7,139,983 | B2 | 11/2006 | Kelts |
| 7,158,118 | B2 | 1/2007 | Liberty |
| 7,170,492 | B2 | 1/2007 | Bell |
| 7,227,526 | B2 | 6/2007 | Hildreth et al. |
| 7,262,760 | B2 | 8/2007 | Liberty |
| 7,268,774 | B2 | 9/2007 | Pittel et al. |
| 7,292,151 | B2 | 11/2007 | Ferguson et al. |
| 7,414,596 | B2 | 8/2008 | Satoh et al. |
| 7,414,611 | B2 | 8/2008 | Liberty |
| 7,417,719 | B2 | 8/2008 | Michelsson |
| 7,457,439 | B1 | 11/2008 | Madsen et al. |
| 7,545,956 | B2 | 6/2009 | Miyahara |
| 7,596,466 | B2 | 9/2009 | Ohta |
| 7,609,249 | B2 | 10/2009 | Fouquet et al. |
| 7,623,115 | B2 | 11/2009 | Marks |
| 7,672,543 | B2 | 3/2010 | Hull et al. |
| 7,683,881 | B2 | 3/2010 | Sun et al. |
| 7,690,994 | B2 | 4/2010 | Dohta |
| 7,710,391 | B2 | 5/2010 | Bell et al. |
| 7,746,321 | B2 | 6/2010 | Banning |
| 7,773,076 | B2 | 8/2010 | Pittel et al. |
| 7,786,976 | B2 | 8/2010 | Ohta |
| 7,815,508 | B2 | 10/2010 | Dohta |
| 7,831,064 | B2 | 11/2010 | Ohta |
| 7,833,100 | B2 | 11/2010 | Dohta |
| 7,834,848 | B2 | 11/2010 | Ohta |
| 7,864,159 | B2 | 1/2011 | Sweetser et al. |
| 7,869,618 | B2 | 1/2011 | Thelen |
| 7,877,224 | B2 | 1/2011 | Ohta |
| 7,893,924 | B2 | 2/2011 | Liberman et al. |
| 7,905,782 | B2 | 3/2011 | Sawano et al. |
| 7,912,286 | B2 | 3/2011 | Ozaki |
| 2002/0011987 | A1 | 1/2002 | Kitazawa |
| 2002/0085097 | A1 | 7/2002 | Colmenarez et al. |
| 2002/0103617 | A1 | 8/2002 | Uchiyama et al. |
| 2003/0017872 | A1 | 1/2003 | Oishi et al. |
| 2004/0005116 | A1 | 1/2004 | Sweetser et al. |
| 2004/0046736 | A1 | 3/2004 | Pryor et al. |
| 2004/0086118 | A1 | 5/2004 | Sweetser et al. |
| 2004/0174340 | A1 | 9/2004 | Bruneau et al. |
| 2004/0174569 | A1 | 9/2004 | Karito |
| 2004/0196451 | A1 | 10/2004 | Aoyama |
| 2004/0208451 | A1 | 10/2004 | Grunnet-Jepsen et al. |
| 2004/0264842 | A1 | 12/2004 | Tsai et al. |
| 2005/0052415 | A1 | 3/2005 | Braun et al. |
| 2005/0104632 | A1 | 5/2005 | Lettvin |
| 2005/0137774 | A1 | 6/2005 | Rupp |
| 2005/0244034 | A1 | 11/2005 | Miyahara |
| 2006/0049930 | A1 | 3/2006 | Zruya et al. |
| 2006/0092380 | A1 | 5/2006 | Salsman et al. |
| 2006/0152487 | A1 | 7/2006 | Grunnet-Jepson |
| 2006/0152489 | A1 * | 7/2006 | Sweetser et al. .............. 345/158 |
| 2006/0267935 | A1 * | 11/2006 | Corson ........................ 345/157 |
| 2007/0002037 | A1 | 1/2007 | Kuroki et al. |
| 2007/0176908 | A1 * | 8/2007 | Lipman et al. ................ 345/179 |
| 2007/0211027 | A1 | 9/2007 | Ohta |
| 2007/0298882 | A1 * | 12/2007 | Marks et al. .................... 463/36 |
| 2008/0012824 | A1 | 1/2008 | Grunnet-Jepsen et al. |
| 2008/0052750 | A1 | 2/2008 | Grunnet-Jepsen et al. |
| 2008/0094354 | A1 * | 4/2008 | Thelen et al. ................. 345/157 |
| 2008/0100574 | A1 | 5/2008 | Lou |
| 2008/0174550 | A1 * | 7/2008 | Laurila et al. ................ 345/158 |
| 2008/0188959 | A1 | 8/2008 | Kneissler |
| 2009/0067006 | A1 | 3/2009 | Kobayashi et al. |
| 2011/0123090 | A1 | 5/2011 | Zerfass et al. |

FOREIGN PATENT DOCUMENTS

| | | |
|---|---|---|
| JP | 08-071252 | 3/1996 |
| JP | 08-292998 | 11/1996 |
| JP | 11-305935 | 11/1999 |
| JP | 2002-081909 | 3/2002 |
| JP | 2003-030686 | 1/2003 |
| JP | 2003-083715 | 3/2003 |
| JP | 2005-021563 | 1/2005 |
| WO | WO 94/02931 | 2/1994 |

OTHER PUBLICATIONS

Machine translation of JP 7-121293.
Office Action dated Jan. 27, 2011 in Japanese application No. 2005-267179.
ADXL202 Specification Sheet: Low Cost ±2 g Dual Axis i MEMs® Accelerometer with Digital Output; Analog Devices, Inc., 1998.
ADXL330 Specification Sheet: Small, Low Power, 3-Axis ±3 g i MEMs® Accelerometer; Analog Devices, Inc., 2007.
Pictures of Microsoft Xwand retrieved on May 13, 2009 from http://www.kf12.com/blogs/uploads/xwand.jpg and http://www.cs.cmu.edu/%7Edwilson/images/xwand.jpg.
Wilson, Andrew D., et al.; "Demonstration of the XWand Interface for Intelligent Spaces"; Microsoft Research; UIST '02 Companion; pp. 37-38.
Wilson, Daniel, et al.; "Gesture Recognition Using the XWand"; Robotics Institute; Carnegie Mellon University; tech report CMU-RI-TR-04-57; Apr. 2004.
Wilson, Andy, "XWand: UI for Intelligent Environments"; Apr. 26, 2004; retrieved May 12, 2009 from http://research.microsoft.com/en-us/um/people/awilson/wand/default.htm.
Wilson, Andrew, et al.; "XWand: UI for Intelligent Spaces"; Microsoft Research; CHI 2003, Apr. 5-10, 2003; Ft. Lauderdale, FL.
Selectech Air Mouse, Description; retrieved on May 5, 2009 from http://cgi.ebay.com.my/ws/eBayISAPI.dll?ViewItem&item=350096666675&indexURL.
European Examination Report Mailed Sep. 15, 2009 in corresponding European Application No. 06 008 517.2, 3 pages.
Gear Technology, "Gears at Play," Nov./Dec. 2003, p. 56.
Air Mouse Go Plus with MotionSense, 2009.

* cited by examiner

FIG. 10
| | CONTROLLER POSITION | CAPTURED IMAGE |
|---|---|---|
| POSITION A | 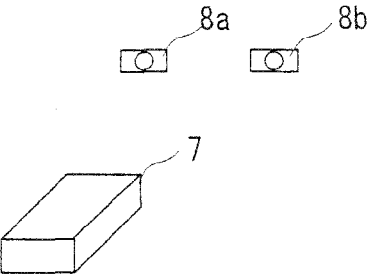 | 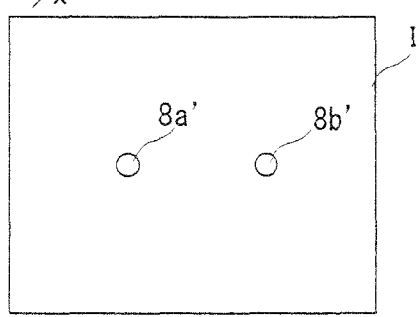 |
| POSITION B | 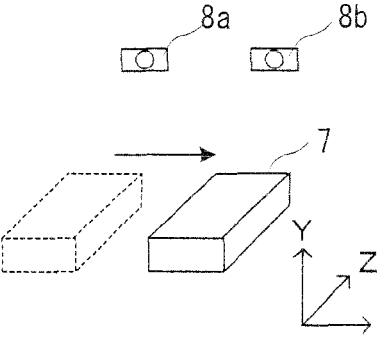 | 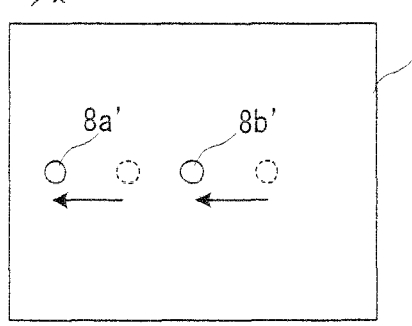 |
| POSITION C | 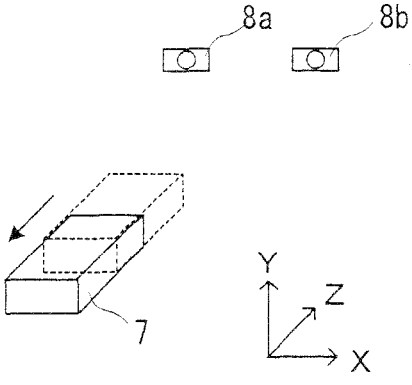 | 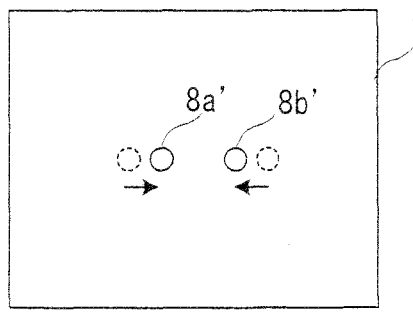 |

REMOTE CONTROL AND SYSTEM AND METHOD USING THE REMOTE CONTROL

CROSS REFERENCE TO RELATED APPLICATIONS

This application is a divisional of application Ser. No. 11/408,964, filed Apr. 24, 2006. The contents of this application are incorporated by reference herein in their entirety. This application claims the benefit of Japanese Patent Application No. 2005-267179, filed Sep. 14, 2005 and the contents of this application are incorporated by reference herein in their entirety.

BACKGROUND

1. Technical Field

This application relates to a video game program and a video game system and, more particularly, to a video game program and a video game system for playing a video game using an optical pointing device.

2. Background

There are conventional video game systems using optical pointing devices. For example, Patent Document 1 (Japanese Laid-Open Patent Publication No. 8-71252) discloses a shooter video game device using a gun-shaped controller. The gun-shaped controller has a CCD camera for sensing light-emitting members provided, as marker objects, around the video screen. Thus, the video game device can detect the distance between the screen and the gun-shaped controller, the rotation of the gun-shaped controller, and the position thereof. Specifically, Patent Document 1 discloses a shooter video game device capable of calculating the position (the coordinates thereof) on the screen being pointed at by the gun-shaped controller.

Patent Document 2 (Japanese Laid-Open Patent Publication No. 2002-81909) also discloses another shooter video game device employing substantially the same configuration as that of Patent Document 1 (see paragraph 0020, etc.). With this shooter video game device, a position on the screen being pointed at by a gun-shaped controller is calculated by using an image captured by image capturing means provided in the gun-shaped controller. In the shooter video game, the calculated position is used as the position at which a gunsight image of the gun-shaped controller is displayed. There are known video games in which the position on the screen being pointed at by a gun-shaped controller is calculated, and used the position at which a gunsight image is displayed.

With these video game devices, the position on the screen being pointed at by the gun-shaped controller can be calculated, and the gunsight image is displayed at the calculated position on the screen. Therefore, the player can easily know the direction in which the gun is being directed, i.e., the position on the screen being pointed at by the gun-shaped controller. When the markers (light-emitting members) are out of the image capturing area of the image capturing means provided in the gun-shaped controller, it means that the aiming point of the gun-shaped controller is outside the screen, in which case the gunsight image on the screen cannot be moved or controlled. If the image capturing means again starts sensing the markers, the gunsight image will be displayed at the position on the screen pointed at by the gun-shaped controller.

A controller using an optical pointing device as described above has primarily been used for moving a gunsight image on the screen in a shooter video game. Recently, with an increasing variety of types of video games, such a controller may be used for controlling any other object in the game space, in addition to controlling a gunsight image on the screen. For example, there are at least two ways in which an object in a three-dimensional game space is moved by using a controller. In the first way, an object is placed at a position in a three-dimensional game space corresponding to a position on the screen pointed at by the controller, and the object is moved across a two-dimensional plane in the game space according to a two-dimensional movement of the position pointed at by the controller. With this technique, however, the object can only be moved across a two-dimensional plane in the game space, which is not at all different from moving a gunsight image in conventional shooter video games, except that the game space is three-dimensional.

In the second way, the player can move the controller up and down to change the Y coordinate of the object placed in a three-dimensional game space defined in an XYZ coordinate system, thereby moving the object up and down in the game space. The player can move the controller left and right to change the X coordinate of the object in the game space, thereby moving the object left and right in the game space. Moreover, the player can move the controller forward and backward to change the Z coordinate of the object in the game space, thereby moving the object forward and backward in the game space.

In the second way as described above, the object in the three-dimensional game space may not always be displayed at the position on the screen pointed at by, for example, the controller (hereinafter referred to as the "pointed position", corresponding to the position of the gunsight image on the screen in conventional shooter video game devices). With a typical three-dimensional game space, the game space is shown in a bird's-eye view as viewed from a virtual camera. Therefore, the up/down, left/right and forward/backward movements in the game space do not always coincide with those as viewed from the virtual camera. Specifically, when an object moves in the up/down direction by a certain distance in the game space, the object moves by a shorter distance on the bird's-eye view of the game space as viewed from the virtual camera. When the object moves in the depth direction in the game space, which is the direction away from the virtual camera, the object on the screen as viewed by the virtual camera moves toward the center of the screen. Thus, the position on the screen pointed at by the controller may not coincide with the position at which the object is displayed on the screen.

In conventional shooter video game devices, the gunsight image is displayed at the position pointed at by the controller. Therefore, the player can easily recognize the direction in which the controller is being directed. However, where the controlled object is not displayed at the pointed position, the player cannot recognize the direction in which the controller is being directed. Since the player cannot recognize the pointed position by looking at the screen, the player may move the controller to such a position that the image capturing means of the controller can no longer sense the markers, whereby the object can no longer be controlled. Particularly, if the player cannot identify the current direction of the controller (i.e., the pointed position) when starting to control the object, the player will have to control the object without knowing at all the direction in which the controller is being directed. Therefore, it is likely that the player moves the controller to such a position that the image capturing means of the controller can no longer sense the markers. This also significantly degrades the controllability in using the controller.

As described above, if the display position of an object being controlled by using a controller does not coincide with the position pointed at by the controller, the player may move the controller to such a position that the object can no longer be controlled.

SUMMARY

Example systems and methods described herein relate to a remote control including an image sensor disposed on a front end portion thereof. First and second markers produced by alight source are detected at the image sensor. A first middle point is calculated based on the detected first and second markers and a second middle point is calculated based on the first middle point and a difference in direction between a reference direction and a direction from the first detected marker to the second detected marker. A position pointed to by the remote control is calculated based on a difference between a reference point and the second middle point. An image signal is generated for an image based at least in part on the pointed-to position.

These and other features, aspects and advantages of the systems and methods described herein will become more apparent from the following detailed description when taken in conjunction with the accompanying drawings.

BRIEF DESCRIPTION OF THE DRAWINGS

FIG. 10 shows how the captured image changes when the position and/or direction of the controller 7 are changed;

DETAILED DESCRIPTION

First Embodiment

Figure 1:
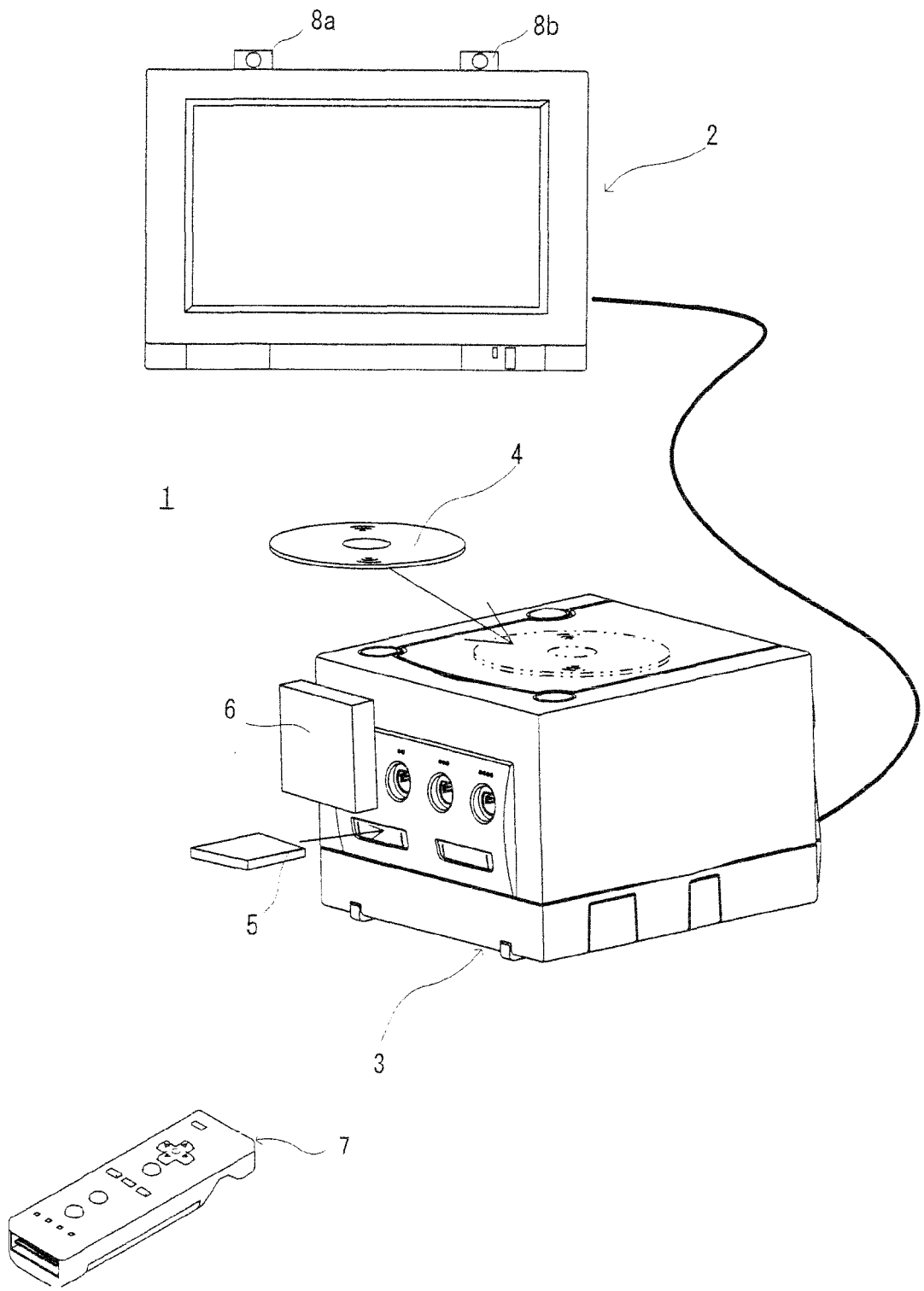
FIG. 1 shows an external view of a video game system 1, being an example of an information processing system in one embodiment of the present invention.

Referring to FIG. 1, a video game system 1, being an information processing system in one embodiment of the present invention, will be described. FIG. 1 shows an external view of the video game system 1. In the present embodiment, the video game system 1 includes a home-console type video game device.

Referring to FIG. 1, the video game system 1 includes a home-console type video game device (hereinafter simply "video game device") 3 and a controller 7 for giving control data to the video game device 3. The video game device 3 is connected, via a connection cord, to a display (hereinafter "monitor") 2 provided with a speaker 22, such as a home television receiver. Two markers 8a and 8b are provided around the monitor 2 (on the upper side of the screen in the illustrated example). Specifically, the markers 8a and 8b are infrared LEDs outputting infrared light to the front side of the monitor 2. A receiver unit 6 is connected to the video game device 3 via a connection terminal. The receiver unit 6 receives control data wirelessly transmitted from the controller 7, and the controller 7 and the video game device 3 are connected via wireless communications. The video game system 1 includes an optical disk 4, being an example of an information storage medium that can be received by the video game device 3. Provided on the upper principal plane of the video game device 3 are an ON/OFF switch for turning ON/OFF the power of the video game device 3, a reset switch for resetting a game process, and an OPEN switch for opening the upper lid of the video game device 3. The lid opens up when the OPEN switch is pressed by the player so that the optical disk 4 can be put in place.

The video game device 3 can also receive an external memory card 5 including a backup memory, or the like, for statically storing save data, or the like. The video game device 3 executes a video game program, or the like, stored in the optical disk 4 to obtain a game image, and displays the obtained game image on the monitor 2. The video game device 3 may reproduce a past game status from save data stored in the external memory card 5 to obtain a game image for that past game status, and display the obtained game image on the monitor 2. Then, the player of the video game device 3 can enjoy the game process by operating the controller 7 while watching the game image displayed on the monitor 2.

The controller 7 wirelessly transmits, from a communications section 36 (to be described later) therein, the control data to the video game device 3, to which the receiver unit 6 is connected, by means of a technique such as Bluetooth (registered trademark), for example. The controller 7 is means for controlling the controlled object (i.e., an object displayed on the monitor 2). The controller 7 has a control section, including a plurality of control buttons. As will be more apparent from the following description, the controller 7 includes an image capturing/processing section 35 (described later) for capturing an image as viewed from the controller 7. Specifically, the image capturing/processing section 35 takes an image of the markers 8*a* and 8*b* provided around the monitor 2. The video game device 3 uses the image to obtain a control signal corresponding to the position and orientation of the controller 7.

Figure 2:
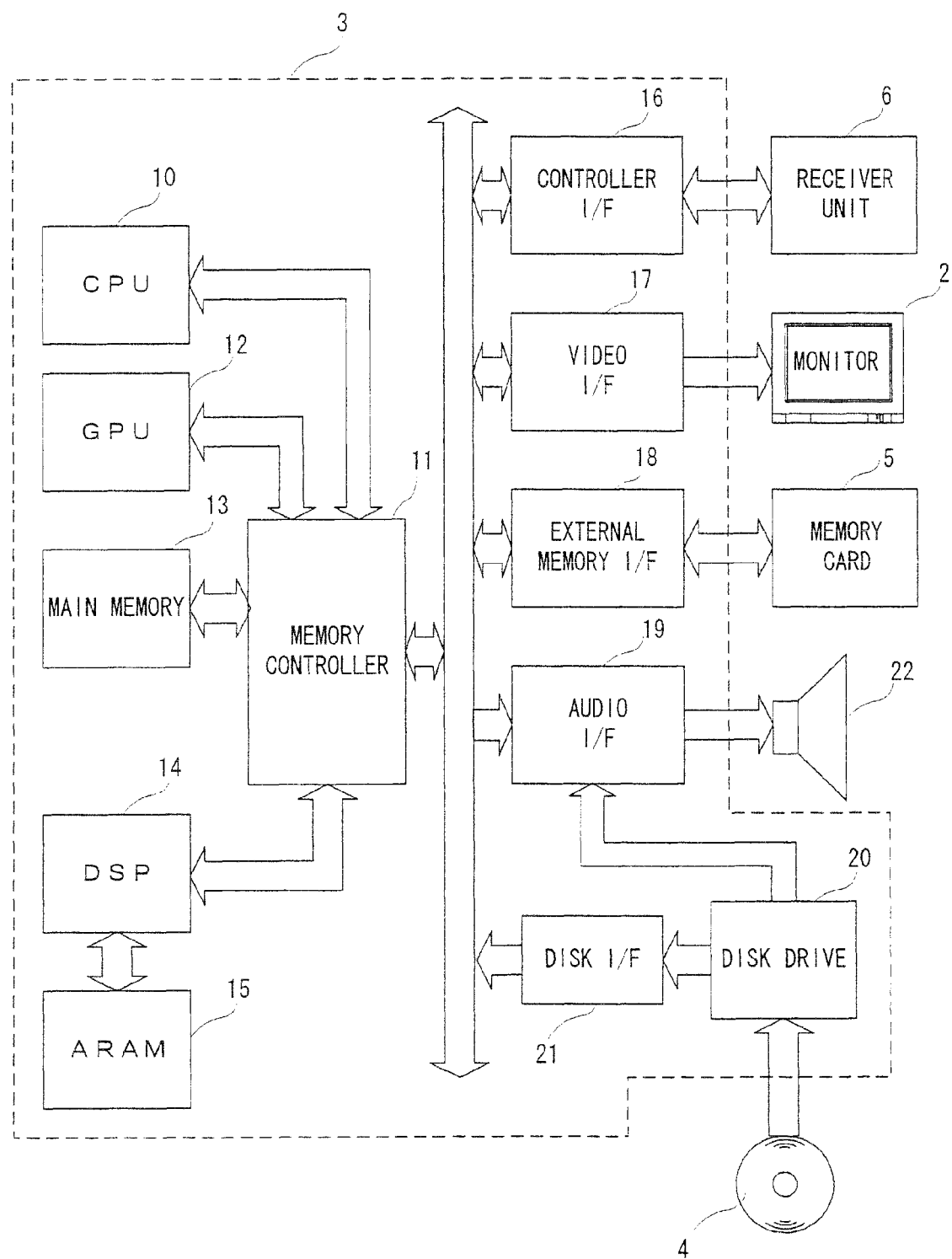
FIG. 2 is a functional block diagram showing a video game device 3.

Referring now to FIG. 2, a configuration of the video game device 3 will be described. FIG. 2 is a functional block diagram showing the video game device 3.

Referring to FIG. 2, the video game device 3 includes a RISC CPU (Central Processing Unit) 10, for example, for executing various programs. The CPU 10 executes a boot program stored in a boot ROM (not shown), thus initializing memory devices, such as a main memory 13, and then executes a video game program stored in the optical disk 4 to perform a game process, etc., according to the video game program. Connected to the CPU 10 via a memory controller 11 are a GPU (Graphics Processing Unit) 12, the main memory 13, a DSP (Digital Signal Processor) 14, and an ARAM (Audio RAM) 15. The memory controller 11 is connected, via a predetermined bus, to a controller I/F (interface) 16, a video I/F 17, an external memory I/F 18, an audio I/F 19 and a disk I/F 21, which are connected to the receiver unit 6, the monitor 2, the external memory card 5, the speaker 22 and a disk drive 20, respectively.

The GPU 12 is responsible for image processing based on instructions from the CPU 10, and is a semiconductor chip, for example, capable of computations necessary for 3D graphics display. The GPU 12 performs the image process by using a memory dedicated for image processing (not shown) or a part of the memory area of the main memory 13. The GPU 12 produces game image data or movie data to be displayed on the monitor 2 using these memory areas, and outputs the produced data to the monitor 2 via the memory controller 11 and the video I/F 17 as necessary.

The main memory 13 is a memory area used by the CPU 10, and stores a video game program, etc., as necessary for processes performed by the CPU 10. For example, the main memory 13 stores the video game program loaded from the optical disk 4 by the CPU 10 and various data, etc. The video game program, the various data, etc., stored in the main memory 13 are executed or processed by the CPU 10.

The DSP 14 is for processing sound data, etc., produced by the CPU 10 when executing the video game program, and is connected to the ARAM 15 for storing the sound data, etc. The ARAM 15 is used when the DSP 14 performs a predetermined process (e.g., storing a video game program, sound data, etc., which have been loaded in advance). The DSP 14 reads out the sound data stored in the ARAM 15, and outputs the sound data through the speaker 22 provided in the monitor 2 via the memory controller 11 and the audio I/F 19.

The memory controller 11 is responsible for the overall control of data transfers, and is connected to the various I/F's described above. The controller I/F 16 includes, for example, four controller I/F portions, each having a connector into which an external unit can be fitted for communicable connection between the external unit and the video game device 3. For example, the receiver unit 6 may be fitted into the connector to be connected to the video game device 3 via the controller I/F 16. As described above, the receiver unit 6 receives control data from the controller 7, and outputs the control data to the CPU 10 via the controller I/F 16. In other embodiments, the video game device 3 may include therein, instead of the receiver unit 6, a receiver module for receiving control data transmitted from the controller 7. In such a case, the transmitted data received by the receiver module is outputted to the CPU 10 via a predetermined bus. The monitor 2 is connected to the video I/F 17. The external memory card 5 is connected to the external memory I/F 18, whereby a backup memory, etc., provided in the external memory card 5 can be accessed. The audio I/F 19 is connected to the speaker 22 provided in the monitor 2 so that the sound data read out from the ARAM 15 by the DSP 14 or the sound data outputted directly from the disk drive 20 can be outputted through the speaker 22. The disk I/F 21 is connected to the disk drive 20. The disk drive 20 reads out data from the optical disk 4 placed in a predetermined read-out position, and outputs the data to the bus or the audio I/F 19 of the video game device 3.

Figure 3A:
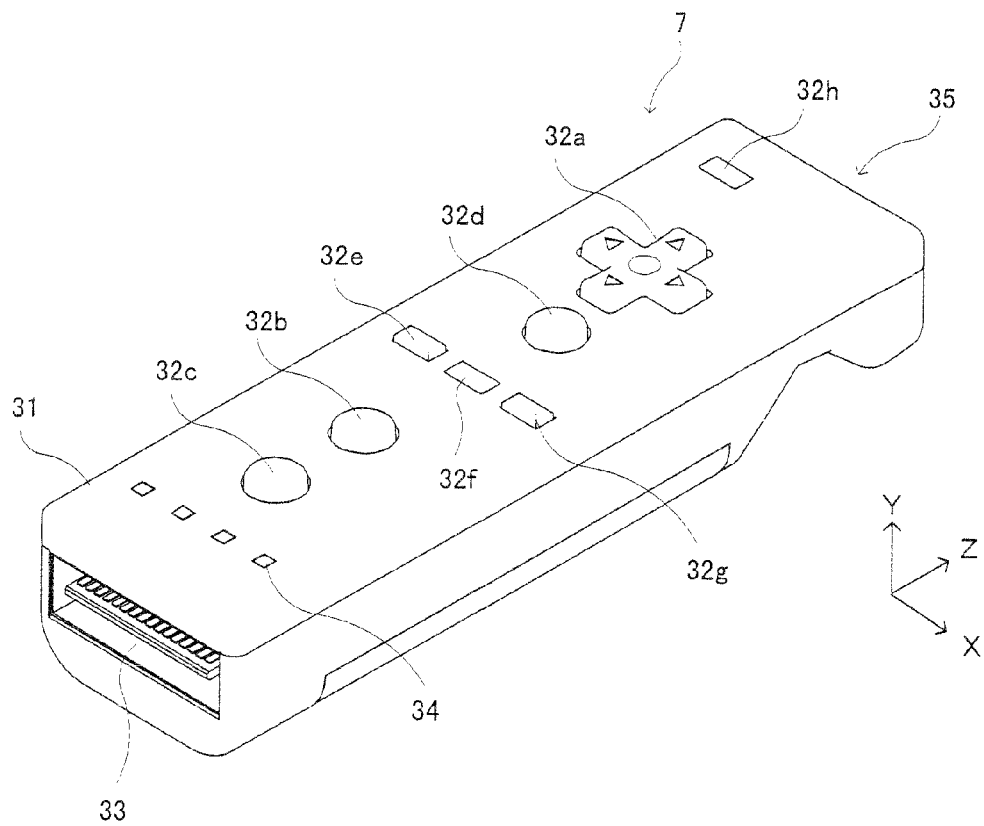
FIGS. 3A and 3B are perspective views showing a controller 7.
Figure 3B:
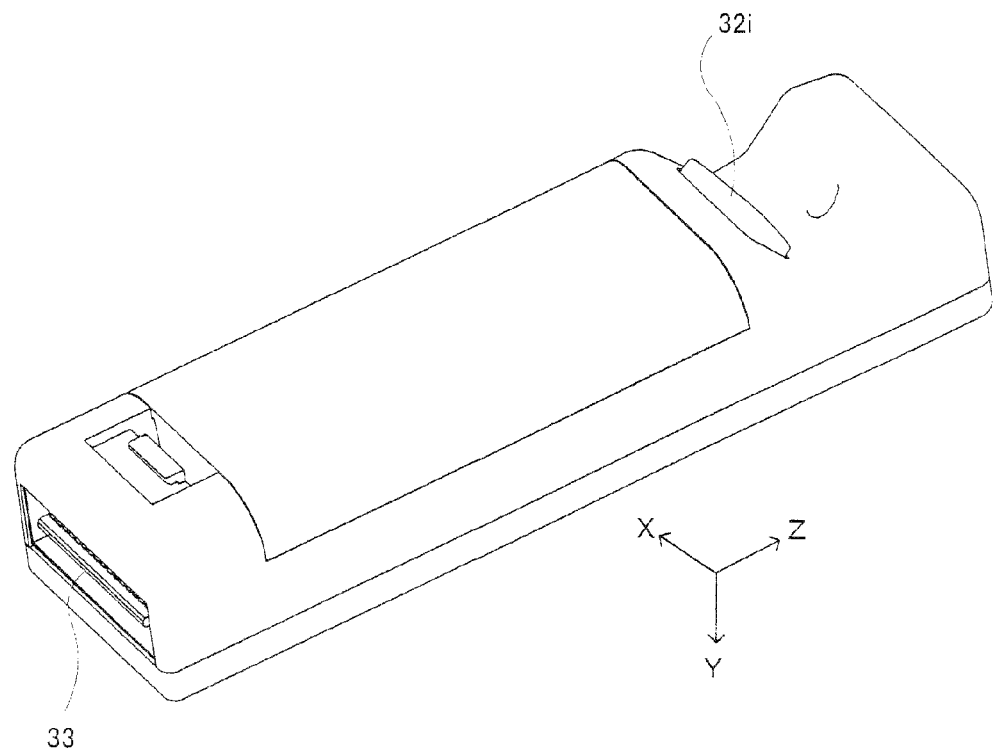
Figure 4:
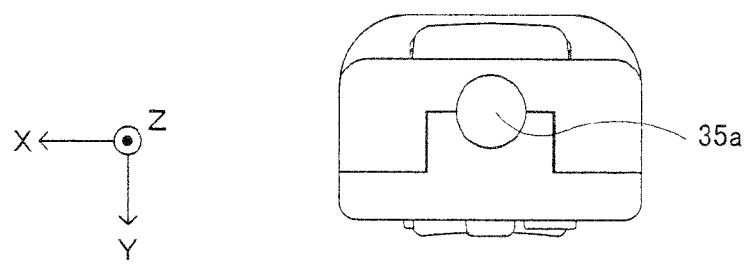
FIG. 4 shows the controller 7 as viewed from the front side.

Referring now to FIGS. 3A to 7, the controller 7 will be described. FIGS. 3A to 5B are perspective views showing the external structure of the controller 7. FIG. 3A is a perspective view showing the controller 7 as viewed from the upper rear side, and FIG. 3B is a perspective view showing the controller 7 as viewed from the lower rear side. FIG. 4 shows the controller 7 as viewed from the front side.

The controller 7 shown in FIGS. 3A, 3B and 4 includes a housing 31 formed by molding a plastic material, for example. The housing 31 has a generally rectangular parallelepiped shape, with the longitudinal direction being the front-rear direction (the Z-axis direction shown in FIG. 3A), and has an overall size such that it can be held in a hand of an adult or a child. The player can use the controller 7 for game operations by pressing buttons provided on the controller 7 and by changing the position and direction of the controller 7 itself. For example, the player can make the controlled object move by turning the controller 7 about an axis in the longitudinal direction. The player can move an object in the game space by changing the position on the screen pointed at by the controller 7. As used herein, "the position on the screen pointed at by the controller 7" is ideally the position at which the straight line extending in the longitudinal direction from the front end of the controller 7 crosses the screen of the monitor 2. However, it does not have to be precisely the position as long as a position in the vicinity thereof can be calculated by the video game device 3. Hereinafter, the position on the screen pointed at by the controller 7 will be referred to as the "pointed position". Moreover, the longitudinal direction of the controller 7 (the housing 31) may hereinafter be referred to as the "pointing direction of the controller 7".

The housing 31 includes a plurality of control buttons. Provided on the upper surface of the housing 31 are a cross-shaped key 32*a*, an X button 32*b*, a Y button 32*c*, a B button 32*d*, a select switch 32*e*, a menu switch 32*f* and a start switch 32*g*. A depressed portion is formed on the lower surface of the housing 31, and an A button 32*i* is provided on a slope on the rear side of the depressed portion. Each of these buttons (switches) is assigned a function as specified in the video game program executed by the video game device 3, the details of which will not be discussed herein as being not directly related to the description of the present invention. A power switch 32h for turning ON/OFF the power of the video game device 3 from a remote position is provided on the upper surface of the housing 31.

Moreover, the controller 7 includes the image capturing/processing section 35 (FIG. 5B), and a light receiving port 35a of the image capturing/processing section 35 is provided on the front side of the housing 31 as shown in FIG. 4. A connector 33 is provided on the rear side of the housing 31. The connector 33 is, for example, a 32-pin edge connector, and may be used for connecting other units to the controller 7. Moreover, a plurality of LEDs 34 are provided on the upper surface of the housing 31 near the rear end. The controller 7 is given a controller ID (number) for identifying the controller 7 from others. The LEDs 34 are used for notifying the player of the controller ID being currently assigned to the controller 7. Specifically, when control data is transmitted from the controller 7 to the video game device 3, one of the LEDs 34 is lit depending on the controller ID.

Figure 5A:
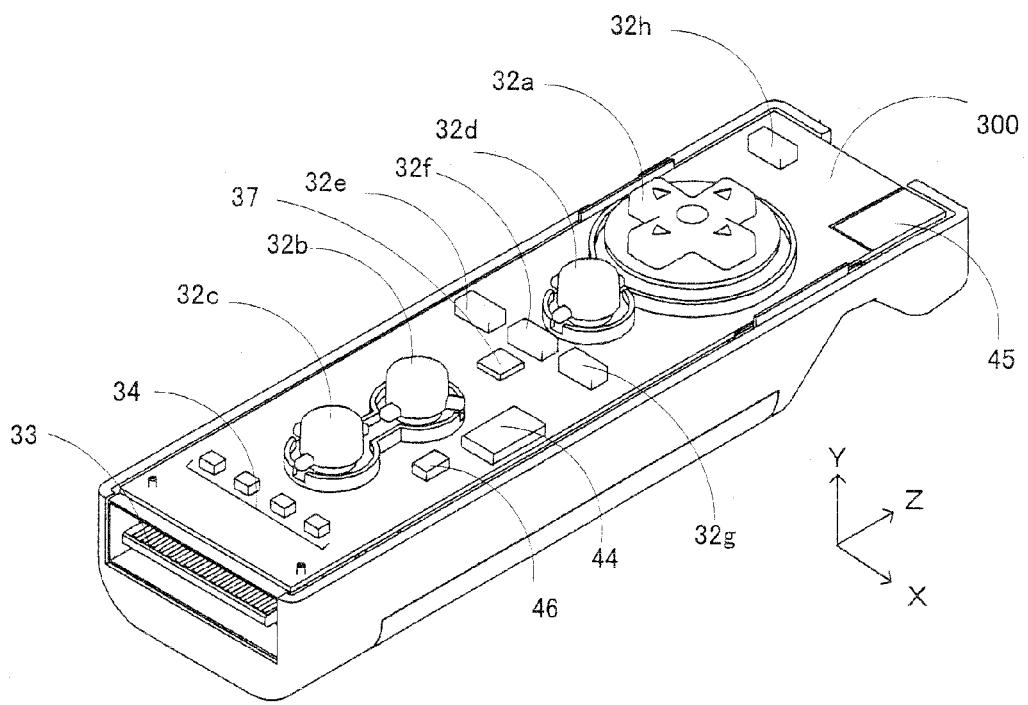
FIGS. 5A and 5B show an internal configuration of the controller 7.
Figure 5B:
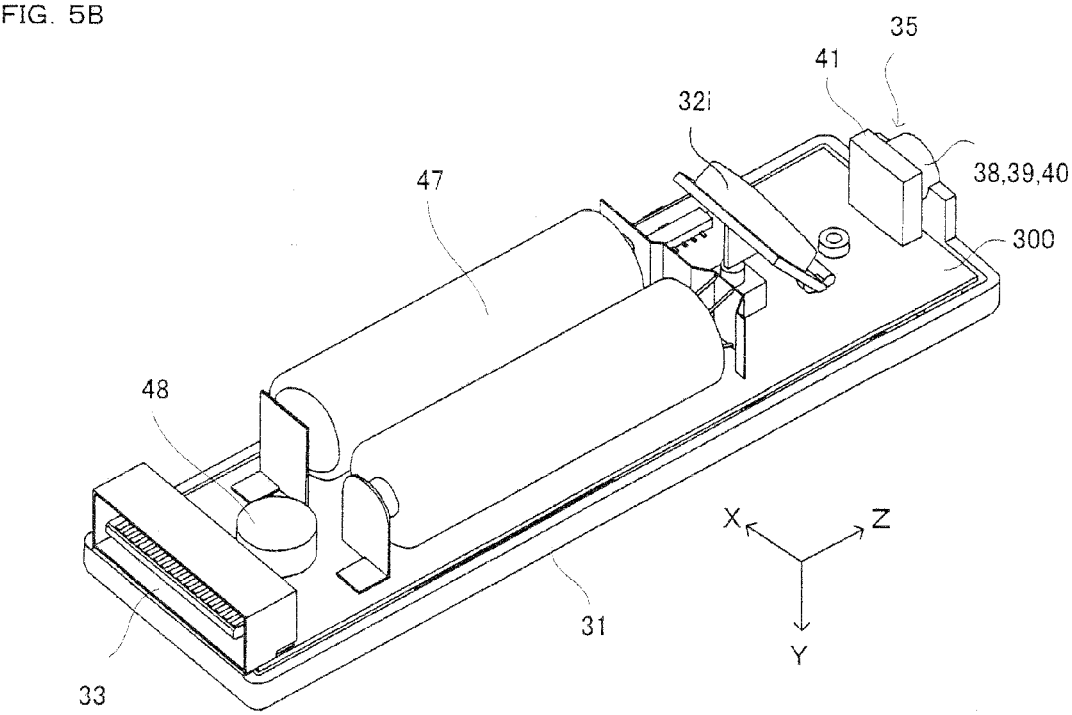
Figure 6:
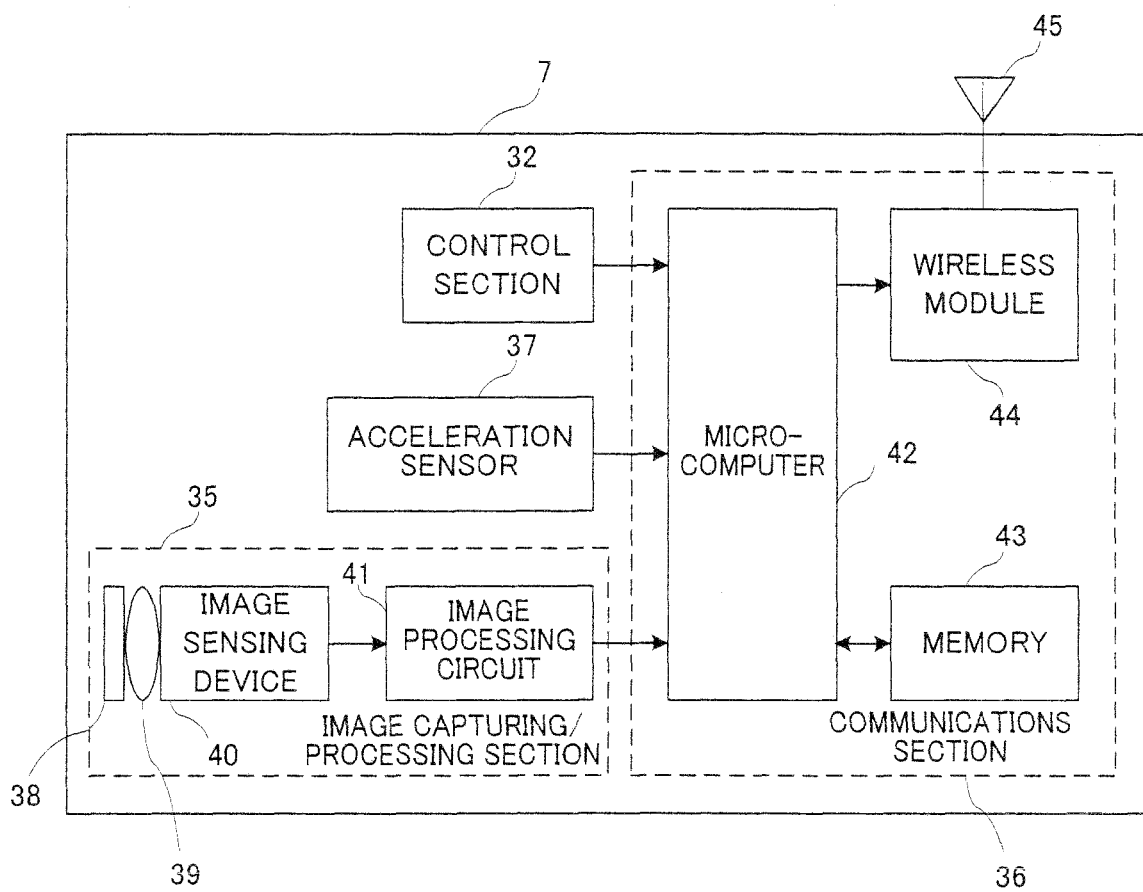
FIG. 6 is a block diagram showing a configuration of the controller 7.

Referring now to FIGS. 5A, 5B and 6, an internal configuration of the controller 7 will be described. FIGS. 5A and 5B show an internal configuration of the controller 7. FIG. 5A is a perspective view showing the controller 7 with an upper casing (a part of the housing 31) taken off. FIG. 5B is a perspective view showing the controller 7 with a lower casing (a part of the housing 31) taken off. FIG. 5A shows one side of a substrate 300, and FIG. 5B shows the other side thereof.

In FIG. 5A, the substrate 300 is secured in the housing 31, and the control buttons 32a to 32h, an acceleration sensor 37, the LED 34, a quartz oscillator 46, a wireless module 44, an antenna 45, etc., are provided on the upper principal plane of the substrate 300. These components are connected to a microcomputer 42 (see FIG. 6) via lines (not shown) formed on the substrate 300, etc. With the wireless module 44 and the antenna 45, the controller 7 can function as a wireless controller. The quartz oscillator 46 generates a basic clock for the microcomputer 42.

Referring to FIG. 5B, the image capturing/processing section 35 is provided at the front edge on the lower principal plane of the substrate 300. The image capturing/processing section 35 includes an infrared filter 38, a lens 39, an image sensing device 40 and an image processing circuit 41 provided in this order from the front side of the controller 7, and these components are provided on the lower principal plane of the substrate 300. The connector 33 is provided at the rear edge on the lower principal plane of the substrate 300. The control button 32i is provided on the lower principal plane of the substrate 300 behind the image capturing/processing section 35, and battery cells 47 are accommodated in a position further behind the control button 32i. A vibrator 48 is provided on the lower principal plane of the substrate 300 between the battery cells 47 and the connector 33. The vibrator 48 may be, for example, a vibrating motor or a solenoid. As the vibrator 48 is actuated, the controller 7 is vibrated, and the vibration is transmitted to the hand of the player holding the controller 7, thus realizing a video game with vibration feed back.

FIG. 6 is a block diagram showing a configuration of the controller 7. In addition to the control section 32 (the control buttons) and the image capturing/processing section 35, the controller 7 includes therein the communications section 36 and the acceleration sensor 37.

The image capturing/processing section 35 is a system for analyzing image data obtained by image capturing means to determine each spot with high luminance and then to detect the centroid and the size thereof. The image capturing/processing section 35 has a sampling frequency of about 200 frames per second, for example, and is thus capable of following fast movements of the controller 7.

Specifically, the image capturing/processing section 35 includes the infrared filter 38, the lens 39, the image sensing device 40 and the image processing circuit 41. The infrared filter 38 passes only an infrared portion of incident light entering the controller 7 from the front side. The markers 8a and 8b provided around the display screen of the monitor 2 are infrared LEDs outputting infrared light to the front side of the monitor 2. Therefore, with the provision of the infrared filter 38, it is possible to more accurately take the image of the markers 8a and 8b. The lens 39 condenses the infrared light passing through the infrared filter 38, and outputs the condensed infrared light to the image sensing device 40. The image sensing device 40 is a solid-state image sensing device, such as a CMOS sensor or a CCD, for capturing the infrared light condensed through the lens 39. Therefore, the image sensing device 40 produces image data by capturing only the infrared light that has passed through the infrared filter 38. The image obtained by the image sensing device 40 will hereinafter be referred to as the "captured image". The image data produced by the image sensing device 40 is processed in the image processing circuit 41. The image processing circuit 41 calculates the positions of the marker objects (the markers 8a and 8b) in the captured image. The image processing circuit 41 outputs coordinates representing the positions of the markers 8a and 8b in the captured image to the communications section 36. The details of the process by the image processing circuit 41 will be described later.

As shown in FIG. 6, the controller 7 preferably includes a three-axis, linear acceleration sensor 37 that detects linear acceleration in three directions, i.e., the up/down direction (Y-axis shown in FIG. 3A), the left/right direction (X-axis shown in FIG. 3A), and the forward/backward direction (Z-axis shown in FIG. 3A). Alternatively, a two axis linear accelerometer that only detects linear acceleration along each of the X-axis and Y-axis (or other pair of axes) may be used in another embodiment depending on the type of control signals desired. As a non-limiting example, the three-axis or two-axis linear accelerometer 37 may be of the type available from Analog Devices, Inc. or STMicroelectronics N.V. Preferably, the acceleration sensor 37 is an electrostatic capacitance or capacitance-coupling type that is based on silicon micro-machined MEMS (microelectromechanical systems) technology. However, any other suitable accelerometer technology (e.g., piezoelectric type or piezoresistance type) now existing or later developed may be used to provide the three-axis or two-axis acceleration sensor 37.

As one skilled in the art understands, linear accelerometers, as used in acceleration sensor 37, are only capable of detecting acceleration along a straight line corresponding to each axis of the acceleration sensor. In other words, the direct output of the acceleration sensor 37 is limited to signals indicative of linear acceleration (static or dynamic) along each of the two or three axes thereof. As a result, the acceleration sensor 37 cannot directly detect movement along a non-linear (e.g. arcuate) path, rotation, rotational movement, angular displacement, tilt, position, attitude or any other physical characteristic.

However, through additional processing of the linear acceleration signals output from the acceleration sensor 37, additional information relating to the controller 7 can be inferred or calculated, as one skilled in the art will readily understand from the description herein. For example, by detecting static, linear acceleration (i.e., gravity), the linear acceleration output of the acceleration sensor 37 can be used to infer tilt of the object relative to the gravity vector by correlating tilt angles with detected linear acceleration. In this way, the acceleration sensor 37 can be used in combination with the micro-computer 42 (or another processor) to determine tilt, attitude or position of the controller 7. Similarly, various movements and/or positions of the controller 7 can be calculated or inferred through processing of the linear acceleration signals generated by the acceleration sensor 37 when the controller 7 containing the acceleration sensor 37 is subjected to dynamic accelerations by, for example, the hand of a user. In another embodiment, the acceleration sensor 37 may include an embedded signal processor or other type of dedicated processor for performing any desired processing of the acceleration signals output from the accelerometers therein prior to outputting signals to micro-computer 42. For example, the embedded or dedicated processor could convert the detected acceleration signal to a corresponding tilt angle when the acceleration sensor is intended to detect static acceleration (i.e., gravity).

With the three-axis acceleration sensor 37, it is possible to determine the inclination of the controller 7 with respect to the X-axis direction, the Y-axis direction and the Z-axis direction. Thus, the video game device 3 can determine the rotation angle of the controller 7 about the z axis not only from the captured image but also through processing of the acceleration signals from the acceleration sensor 37. The data representing the acceleration detected by the acceleration sensor 37 is outputted to the communications section 36.

In another exemplary embodiment, the acceleration sensor 37 may be replaced with a gyro-sensor of any suitable technology incorporating, for example, a rotating or vibrating element. Exemplary MEMS gyro-sensors that may be used in this embodiment are available from Analog Devices, Inc. Unlike the linear acceleration sensor 37, a gyro-sensor is capable of directly detecting rotation (or angular rate) around an axis defined by the gyroscopic element (or elements) therein. Thus, due to the fundamental differences between a gyro-sensor and an linear acceleration sensor, corresponding changes need to be made to the processing operations that are performed on the output signals from these devices depending on which device is selected for a particular application. More specifically, when a tilt or inclination is calculated using a gyroscope instead of the acceleration sensor, significant changes are necessary. Specifically, when using a gyro-sensor, the value of inclination is initialized at the start of detection. Then, data on the angular velocity which is output from the gyroscope is integrated. Next, a change amount in inclination from the value of inclination previously initialized is calculated. In this case, the calculated inclination corresponds to an angle. In contrast, when an acceleration sensor is used, the inclination is calculated by comparing the value of the acceleration of gravity of each axial component with a predetermined reference. Therefore, the calculated inclination can be represented as a vector. Thus, without initialization, an absolute direction can be determined with an accelerometer. The type of the value calculated as an inclination is also very different between a gyroscope and an accelerometer; i.e., the value is an angle when a gyroscope is used and is a vector when an accelerometer is used. Therefore, when a gyroscope is used instead of an acceleration sensor or vice versa, data on inclination also needs to be processed by a predetermined conversion that takes into account the fundamental differences between these two devices. Due to the fact that the nature of gyroscopes is known to one skilled in the art, as well as the fundamental differences between linear accelerometers and gyroscopes, further details are not provided herein so as not to obscure the remainder of the disclosure. While gyro-sensors provide certain advantages due to their ability to directly detect rotation, linear acceleration sensors are generally more cost effective when used in connection with the controller applications described herein.

The communications section 36 includes the microcomputer 42, a memory 43, the wireless module 44 and the antenna 45. The microcomputer 42 controls the wireless module 44 for wirelessly transmitting data obtained by the microcomputer 42 while using the memory 43 as a memory area.

The data outputted from the control section 32, the acceleration sensor 37 and the image capturing/processing section 35 to the microcomputer 42 are temporarily stored in the memory 43. Data are wirelessly transmitted from the communications section 36 to the receiver unit 6 at regular intervals. Since the game process typically proceeds in a cycle of 1/60 second, the interval should be shorter than 1/60 second. At the transmission timing for transmitting data to the receiver unit 6, the microcomputer 42 outputs, as control data, data stored in the memory 43 to the wireless module 44. The wireless module 44 uses a technique such as Bluetooth (registered trademark) to modulate a carrier of a predetermined frequency with the control data, and radiates the weak radio wave signal from the antenna 45. Thus, the control data is modulated by the wireless module 44 into a weak radio wave signal and transmitted from the controller 7. The weak radio wave signal is received by the receiver unit 6 of the video game device 3. The video game device 3 can obtain the control data by demodulating and decoding the received weak radio wave signal. The CPU 10 of the video game device 3 performs the game process based on the obtained control data and the video game program.

Note that the shape of the controller 7, and the shape, number and arrangement of the control switches shown in FIGS. 3A to 5B are all illustrative, and it is understood that the present invention can be carried out with any other suitable shape, number and arrangement. The position of the image capturing/processing section 35 in the controller 7 (the light receiving port 35a of the image capturing/processing section 35) does not have to be the front side of the housing 31, but may be on any other side as long as light can be received from outside the housing 31. Then, the "pointing direction of the controller 7" is a direction perpendicular to the light receiving port.

By using the controller 7, the player can perform game operations such as moving the position of the controller 7 itself or turning the controller 7, in addition to the conventional game operation, i.e., pressing the control switches. The game operation using the controller 7 will now be described.

Figure 7:
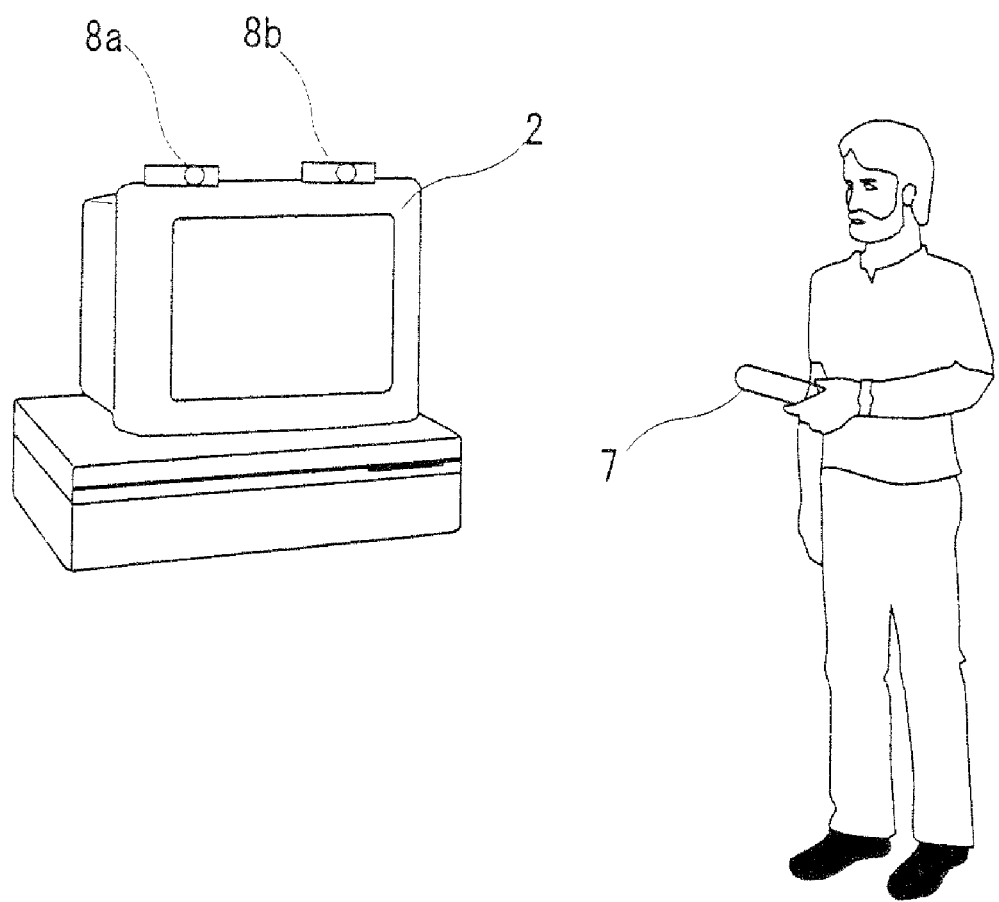
FIG. 7 generally shows how the player uses the controller 7 to perform a game operation.

FIG. 7 generally shows how the player uses the controller 7 to perform a game operation. As shown in FIG. 7, when playing the game on the video game system 1 by using the controller 7, the player holds the controller 7 in one hand. The markers 8a and 8b are arranged in parallel to the horizontal direction of the screen of the monitor 2. The player holds the controller 7 with the front side of the controller 7 (the side for receiving light to be sensed by the image capturing/processing section 35) facing toward the markers 8a and 8b. The player performs a game operation by changing the position on the screen pointed at by the controller 7 or changing the distance between the controller 7 and the markers 8a and 8b.

Figure 8:
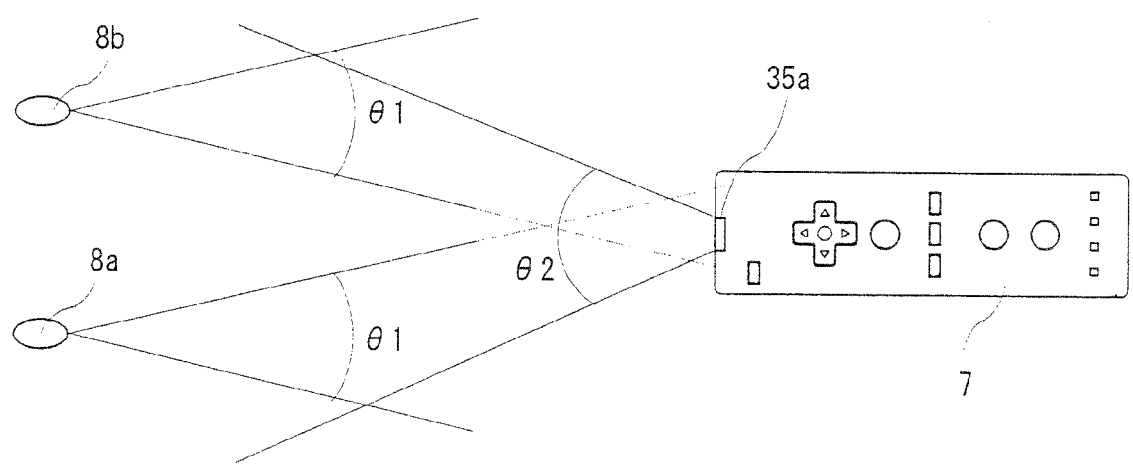
FIG. 8 shows viewing angles between markers 8a and 8b and the controller 7.

FIG. 8 shows viewing angles between the markers 8a and 8b and the controller 7. As shown in FIG. 8, the markers 8a and 8b each radiate infrared light over a viewing angle θ1. The image sensing device 40 of the image capturing/processing section 35 can receive incident light within a range of a viewing angle θ2 about the viewing direction of the controller 7. For example, the viewing angle θ1 of each of the markers 8a and 8b is 34° (half angle), and the viewing angle θ2 of the image sensing device 40 is 41°. The player holds the controller 7 at such a position and in such a direction that the image sensing device 40 can receive infrared light from the two markers 8a and 8b. Specifically, the player holds the controller 7 so that at least one of the markers 8a and 8b is present within the viewing angle θ2 of the image sensing device 40 while the controller 7 is present within the viewing angle θ1 of at least one of the marker 8a or 8b. In such a state, the controller 7 can detect the marker 8a and/or 8b. The player can perform a game operation by changing the position and direction of the controller 7 while satisfying such a condition. If the position and direction of the controller 7 are out of range, it is no longer possible to perform a game operation based on the position and direction of the controller 7. The acceptable range as described above will be referred to as the "controllable range".

Figure 9:
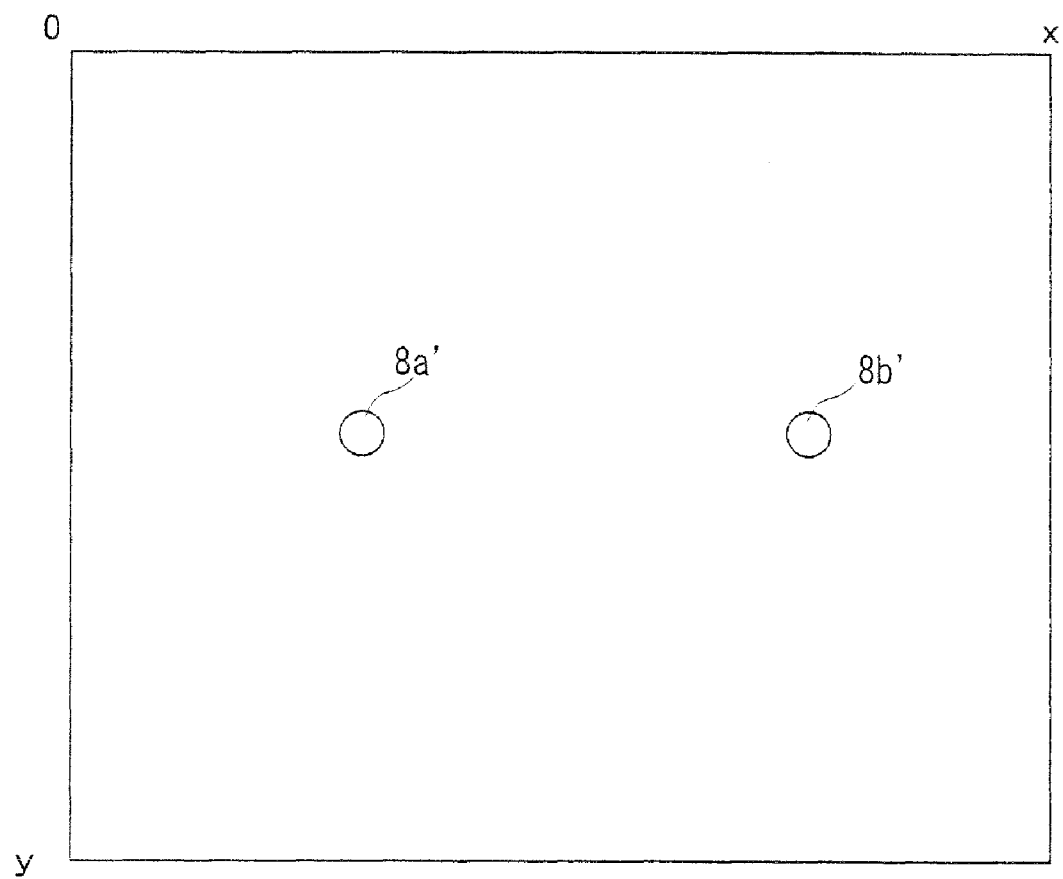
FIG. 9 shows an exemplary captured image including object images.

While the controller 7 is held within the controllable range, the image capturing/processing section 35 takes the image of the markers 8a and 8b. Specifically, the captured image obtained by the image sensing device 40 includes the images of the markers 8a and 8b being marker objects (object images). FIG. 9 shows an exemplary captured image including object images. By using the image data of the captured image including the object images, the image processing circuit 41 calculates the coordinates representing the position of each of the markers 8a and 8b (marker position) in the captured image.

In the image data of the captured image, an object image is present as a high-luminance portion. Therefore, the image processing circuit 41 first detects a high-luminance portion as a candidate object image. Then, based on the size of the detected high-luminance portion, it is determined whether or not the high-luminance portion is an object image. In addition to images 8a' and 8b' of the two markers 8a and 8b being object images, the captured image may include images other than the object images, e.g., sunlight coming in through a window or light from a fluorescent light. The determination process is for accurately detecting object images by distinguishing the images 8a' and 8b' of the markers 8a and 8b being object images from others. Specifically, in this determination process, it is determined whether or not the size of the detected high-luminance portion is in a predetermined range. If the size of the high-luminance portion is in the predetermined range, it is determined that the high-luminance portion represents an object image. If the size of the high-luminance portion is not within the predetermined range, it is determined that the high-luminance portion represents an image other than the object image.

If a high-luminance portion is determined to represent an object image in the determination process, the image processing circuit 41 calculates the position of the high-luminance portion. Specifically, the image processing circuit 41 calculates the centroid of the high-luminance portion. The position of the centroid will be referred to as the "marker position". The centroid can be calculated on a scale finer than the resolution of the image sensing device 40. It is assumed herein that the image taken by the image sensing device 40 has a resolution of 126×96, and the centroid is calculated on a 1024×768 scale. Therefore, the marker position is represented by a set of coordinates ranging from (0,0) to (1024, 768). Note that a position in the captured image is represented in a coordinate system (xy coordinate system) where the upper left corner of the captured image is the origin, the downward direction is the positive y-axis direction, and the rightward direction is the positive x-axis direction. When the object images are properly detected, two high-luminance portions are determined to be object images in the determination process, and therefore two marker positions are detected in the calculation process. The image processing circuit 41 outputs data representing two marker positions calculated in the calculation process. The outputted marker position data is transmitted as described above by the microcomputer 42 to the video game device 3 as control data. In the present embodiment, the processes up to the calculation of the marker position from the captured image are performed by the image processing circuit 41 and/or the microcomputer 42 of the controller 7. Alternatively, similar processes can be performed by, for example, sending the captured image to the video game device 3 so that the processes are performed by the CPU 10, or the like, of the video game device 3.

By using the data of the marker position included in the received control data, the video game device 3 can calculate the pointed position and the distance from the controller 7 to each of the markers 8a and 8b. FIG. 10 shows how the captured image changes when the position and/or direction of the controller 7 are changed. FIG. 10 shows various positions of the controller, and the corresponding captured image to be obtained for each of these positions. In FIG. 10, a captured image I1 is the image captured when the controller 7 is in a position A. In the captured image I1, the images 8a' and 8b' of the markers 8a and 8b being object images are located near the center of the captured image I1. In the position A, the controller 7 is pointing at a position in the middle between the marker 8a and the marker 8b.

A position B shown in FIG. 10 is a position obtained by moving (without turning) the controller 7 in the rightward direction (the positive X-axis direction) from the position A. In the position B, a captured image I3 is obtained by the image capturing/processing section 35. In the captured image I3, the object images 8a' and 8b' have been translated in the leftward direction (the negative x-axis direction) from their positions in the captured image I1. In the position B, the pointing direction of the controller 7 is moved in the rightward direction from the position A. The pointing direction of the controller 7 can be moved in the rightward direction not only by moving (without turning) the controller 7 in the rightward direction but also by turning the controller 7 about the Y axis. Thus, a captured image similar to the captured image I3 is obtained also when the controller 7 is turned about the Y axis. As described above, if the controller 7 is moved (turned) so as to move the pointing direction of the controller 7 in the rightward direction, there is obtained a captured image similar to the captured image I3, i.e., an image obtained by translating the object images 8a' and 8b'. Thus, it is possible to know the pointing direction of the controller 7 by detecting the position of the object image in the captured image (the position of the middle point between the image 8a' and the image 8b' in the example to be described later).

A position C shown in FIG. 10 is a point obtained by moving the controller 7 away from the markers 8a and 8b from the position A (i.e., by moving (without turning) the controller 7 in the rearward direction). In the position C, a captured image I4 is obtained by the image capturing/processing section 35. In the captured image I4, the distance between the image 8a' and the image 8b' is shorter than that in the captured image I1. Thus, it is possible to know the distance between the controller 7 and each of the markers 8a and 8b by detecting the distance between the two marker images in the captured image (the distance between the image 8a' and the image 8b', or the size of the entirety of the two object images taken as one).

Figure 11:
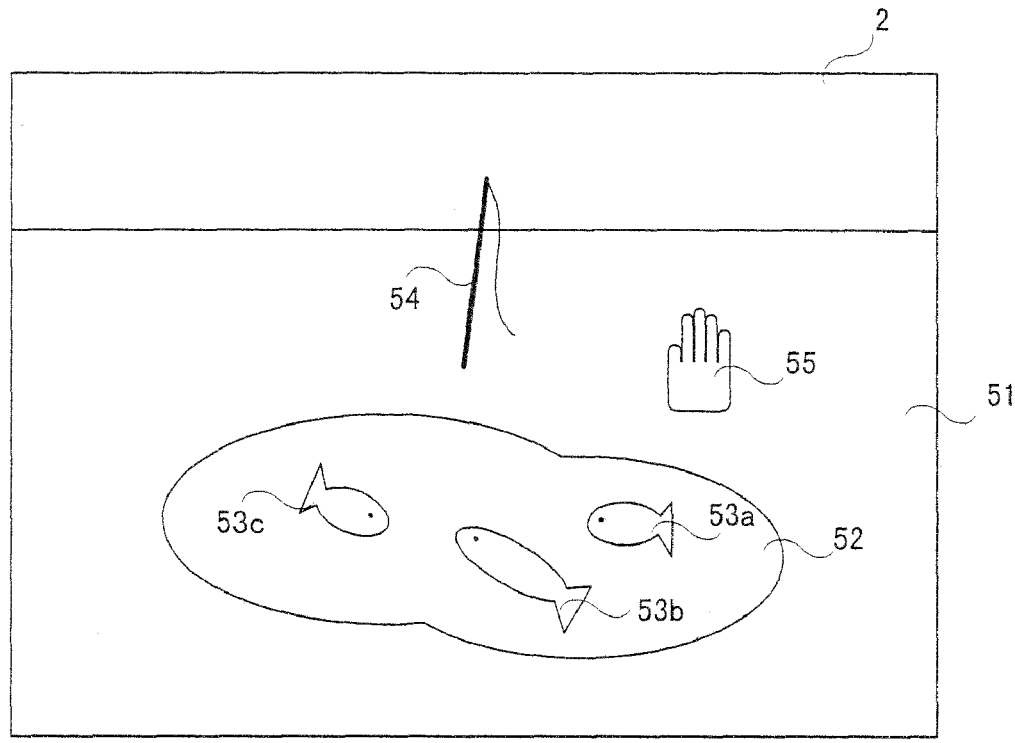
FIG. 11 shows an exemplary game screen in one embodiment of the present invention.

An exemplary video game to be played on a video game system as described above will now be described. The present embodiment is directed to a video game (fishing video game) in which an object (fishing rod) is moved in a virtual three-dimensional game space. FIG. 11 shows an exemplary game screen of the present embodiment. In FIG. 11, displayed on the screen of the monitor 2 is a terrain including a ground 51 and a pond 52. There are fish 53a to 53c in the pond 52. A fishing rod 54 is displayed above the pond 52. The ground 51, the pond 52, the fish 53a to 53c and the fishing rod 54 are objects present in a three-dimensional game space. Also displayed on the screen is a cursor 55, being an example of a pointer image representing the position being pointed at by the controller 7. In the present video game, the player uses the controller 7 to move the fishing rod 54, being an example of the controlled object, in order to catch the fish 53a to 53c with the fishing rod 54. Note that the fishing rod 54 is an example of the controlled object and is also an example of the reference image. It is understood that different images may be used for the controlled object and the reference image. Even if the same three-dimensional object is used for the fishing rod 54, different texture colors may be used on the object between when it is used as the controlled object and when it is used as the reference image.

Figure 12:
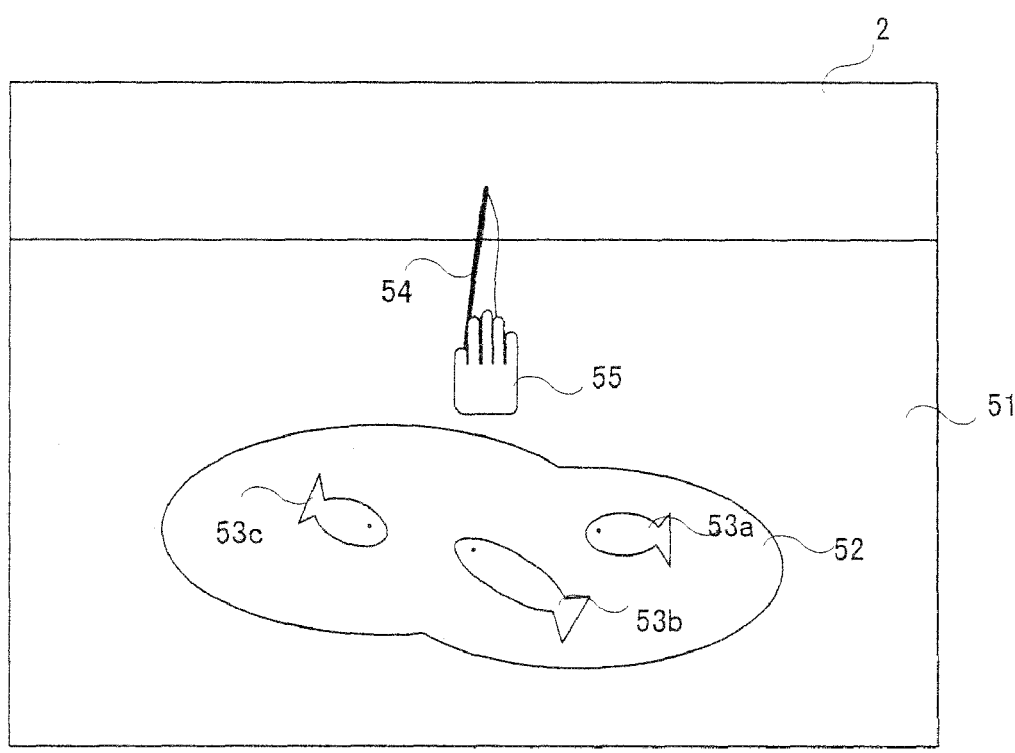
FIG. 12 shows a game screen where a cursor 55 overlaps a fishing rod 54.

FIG. 11 shows the game screen immediately after the start of the game. Immediately after the start of the game, the fishing rod 54 is displayed at a predetermined position, e.g., near the center of the screen. Note however that, immediately after the start of the game, the player cannot control the fishing rod 54. Immediately after the start of the game, the player needs to control the cursor 55. The player can move the cursor 55 by changing the position pointed at by the controller 7. Since the cursor 55 is displayed at the position pointed at by the controller 7, the player can check the pointed position by looking at the cursor 55. Immediately after the start of the game, the player moves the cursor 55 until the area of the cursor 55 includes at least a portion of the fishing rod 54 (e.g., so that the cursor 55 overlaps the fishing rod 54). FIG. 12 shows a game screen where the cursor 55 overlaps the fishing rod 54. After moving the cursor 55 to a position shown in FIG. 12, the player can control the fishing rod 54.

Figure 13:
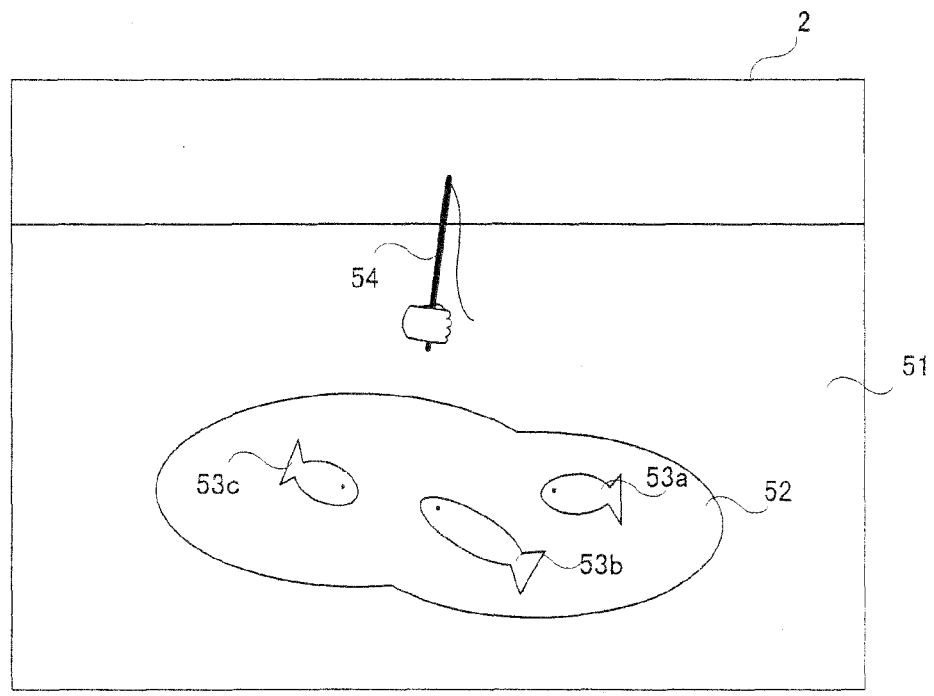
FIG. 13 shows a game screen where the player is allowed to controlling the fishing rod 54.
Figure 14:
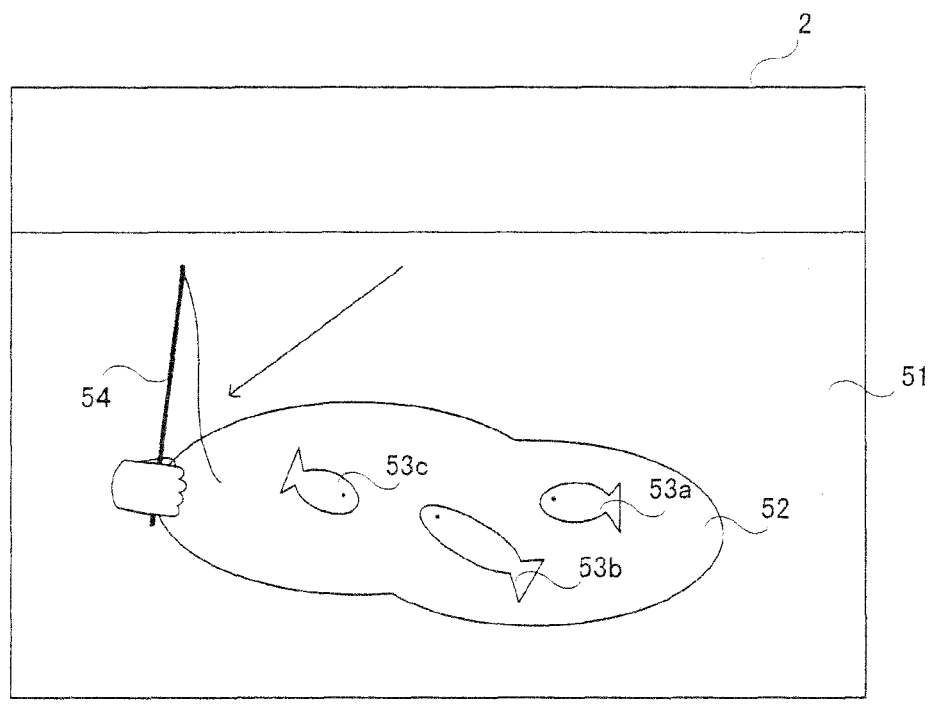
FIG. 14 shows a game screen after the fishing rod 54 is moved.

FIG. 13 shows a game screen where the player is allowed to control the fishing rod 54. After the cursor 55 overlaps the fishing rod 54, the cursor 55 is erased from the screen as shown in FIG. 13. It is not always necessary to erase the cursor 55, but the cursor 55 may be replaced with another cursor. Then, in order to indicate that the player is allowed to control the fishing rod 54, the image of the fishing rod 54 is switched to another one in which the fishing rod 54 is shown to be being held by a hand. Then, the player can move the fishing rod 54 in the three-dimensional game space. FIG. 14 shows a game screen after the fishing rod 54 is moved. The player, using the controller 7, can freely move the fishing rod 54 across the three-dimensional space. The player can move the fishing rod not only in the up/down and left/right directions of the screen, but also in the depth direction of the screen.

Figure 15:
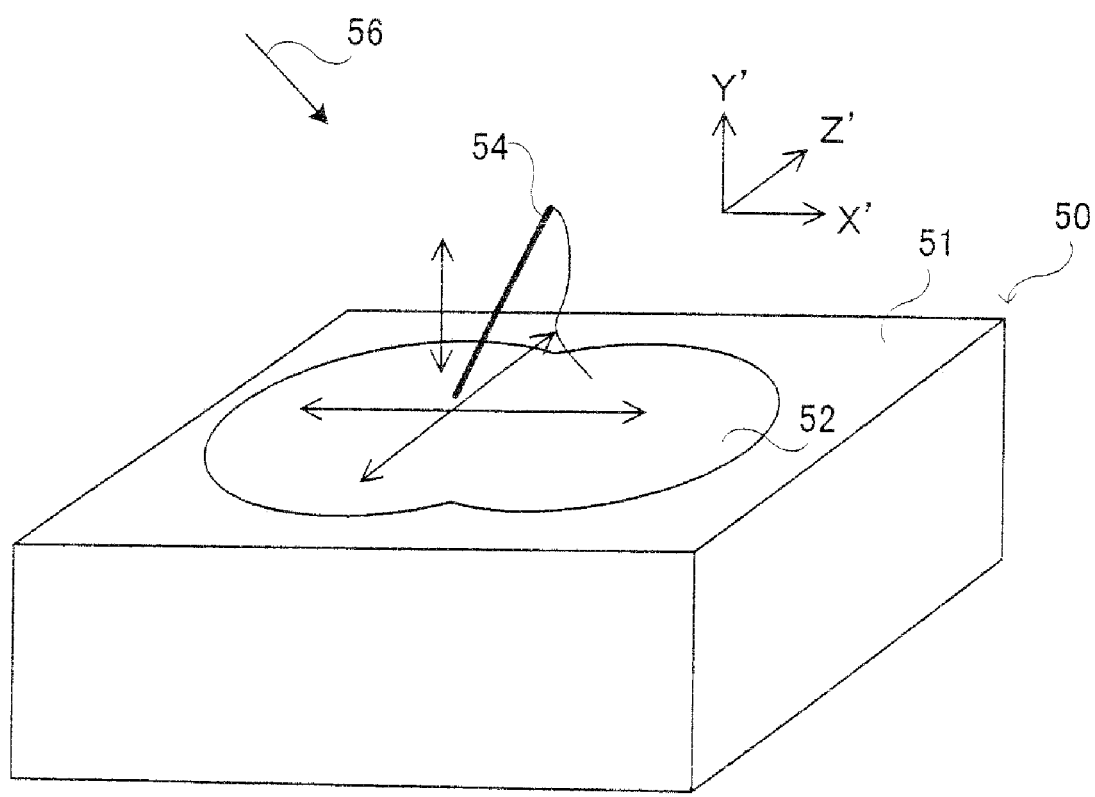
FIG. 15 shows a game space.

FIG. 15 shows the three-dimensional game space. As shown in FIG. 15, in the present embodiment, various three-dimensional objects, e.g., a terrain 50 including the ground 51 and the pond 52, the fishing rod 54, fish (not shown), etc., are placed in the world coordinate system being the game space. The terrain 50 is placed so that the X'Z' plane of the game space is parallel to the ground 51, and the Y' axis is perpendicular to the ground 51. The virtual camera for taking an image of the game space is positioned above the ground 51. The viewing direction of the virtual camera is set with an angle of depression so that the virtual camera will look down the ground 51 (see an arrow 56 shown in FIG. 15). In FIG. 15, the viewing direction 56 of the virtual camera is facing the rear side.

After the player is allowed to control the fishing rod 54 as described above with reference to FIGS. 13 and 14, if the player moves the controller 7 in the left/right direction with respect to the markers 8a and 8b (parallel to the direction in which the markers 8a and 8b are arranged with respect to each other in the present embodiment), the fishing rod 54 moves in the X'-axis direction. If the player moves the controller 7 in the up/down direction with respect to the markers 8a and 8b (the up/down direction perpendicular to the direction in which the markers 8a and 8b are arranged with respect to each other), the fishing rod 54 moves in the Y'-axis direction. If the player moves the controller 7 in the forward/backward direction with respect to the markers 8a and 8b (the forward/backward direction perpendicular to the direction in which (the markers 8a and 8b are arranged with respect to each other), the fishing rod 54 moves in the Z'-axis direction. If the controller 7 is moved excessively in the left/right direction or in the up/down direction, the markers 8a and 8b will be outside the range of the image sensing device 40 of the controller 7. As a result, it is no longer possible to calculate the movement of the controller 7, and the player is no longer able to control the fishing rod 54.

The three-dimensional game space can be rendered as a two-dimensional game image by perspectively projecting the various objects in the view volume onto a two-dimensional screen plane, which is perpendicular to the viewing direction 56 of the virtual camera. The screen plane is not parallel to the horizontal plane of the game space. Usually, perspective projection is employed for stereoscopic effect, whereby the two-dimensional image is given perspective distortion. Thus, the position of the fishing rod 54, which moves across the three-dimensional space, as displayed on the screen does not always coincide with the position pointed at by the controller 7. When the controller 7 is moved in the forward/backward direction, for example, the pointed position does not change, but the fishing rod 54 moves in the Z'-axis direction, thereby changing its display position, so that the position pointed at by the controller 7 no longer coincides with the display position of the fishing rod 54.

If the player needs to start controlling the fishing rod 54 immediately after the start of the game (when the cursor 55 is not yet displayed on the screen), the player will have to control the fishing rod 54 without knowing where the pointed position is. Therefore, it is likely that the player will move the controller 7 beyond the controllable range, whereby a situation frequently occurs where the fishing rod 54 cannot be controlled. In view of this, in the present embodiment, the player is allowed to check the pointed position using the cursor 55 before the player starts controlling the fishing rod 54. As the player is allowed to move the cursor 55 according to the pointed position so as to align the cursor 55 with the fishing rod 54, the player can check the pointed position before the player starts controlling the fishing rod 54. While the player moves the cursor 55, the player is also allowed to check to what extent the player can move the controller 7 without going outside the controllable range. As the player is allowed to check the pointed position before the player starts controlling the fishing rod 54, the player can have some idea of the location of the pointed position while the player is controlling the fishing rod 54. Thus, it is unlikely that the player moves the controller 7 beyond the controllable range, thereby preventing the fishing rod 54 from frequently becoming uncontrollable. Moreover, since the player can have some idea of the location of the pointed position while the player is controlling the fishing rod 54, the controllability of the controller 7 is improved.

In the present embodiment, if the controller 7 goes outside the controllable range, the game screen returns to the initial screen immediately after the start of the game (as shown in FIG. 11). Specifically, the fishing rod 54 returns to its initial position, and can no longer be controlled by the player. Moreover, the cursor 55 is displayed again on the screen. Thus, if the controller 7 goes outside the controllable range, the player needs to again move the cursor 55 to align the cursor 55 with the fishing rod 54. Therefore, when the controller 7 goes outside the controllable range, the player is allowed to again check the pointed position.

In other embodiments, the player may be allowed to check the pointed position using the cursor 55 only immediately after the start of the game, or only after the controller 7 goes outside the controllable range.

Figure 16:
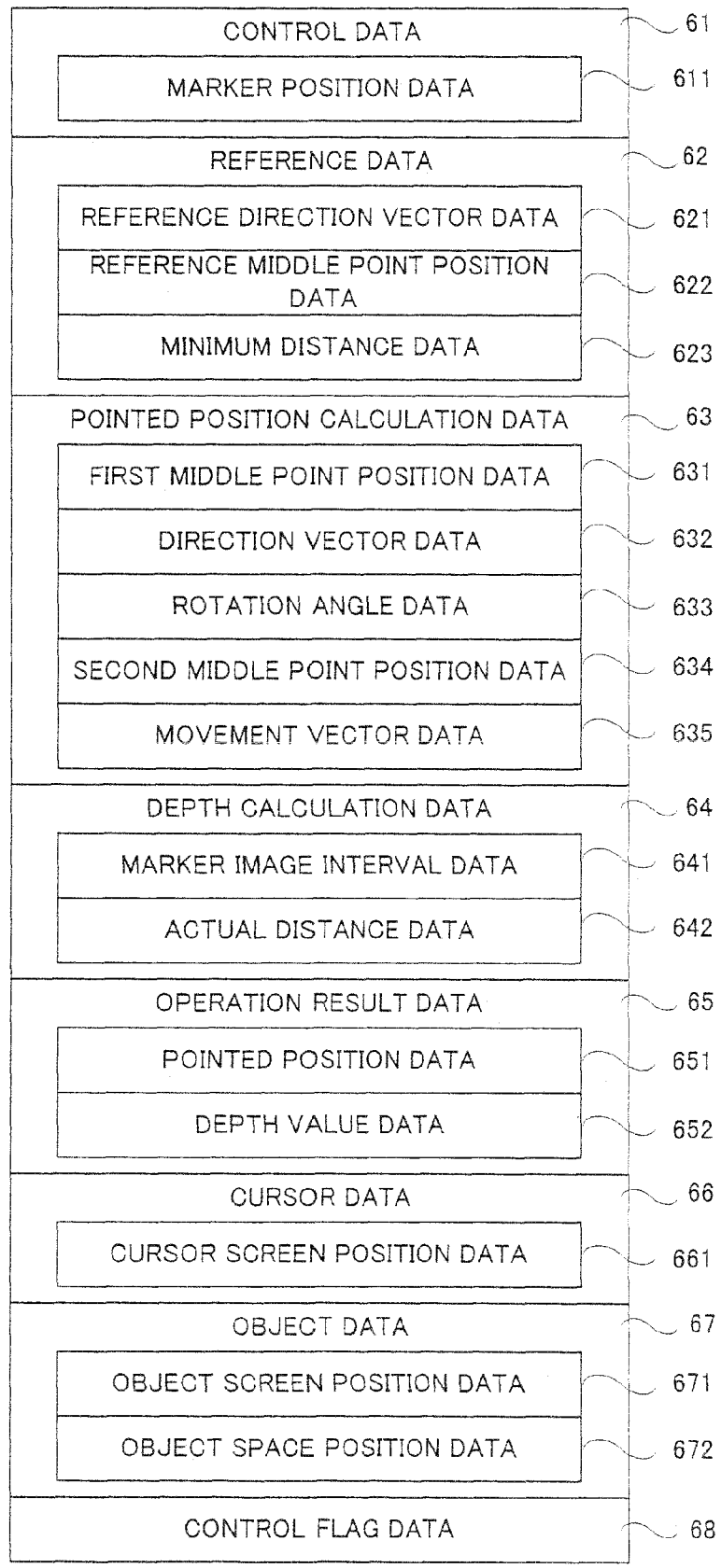
FIG. 16 shows important data to be stored in a main memory 13 of the video game device 3.

The details of the game process performed by the video game device 3 will now be described. First, important data to be used in the game process will be described with reference to FIG. 16. FIG. 16 shows important data to be stored in the main memory 13 of the video game device 3. Referring to FIG. 16, the main memory 13 stores control data 61, reference data 62, pointed position calculation data 63, depth calculation data 64, operation result data 65, cursor data 66, object data 67, control flag data 68, etc. In addition to those shown in FIG. 16, the main memory 13 also stores other data necessary for the game process, such as character data (e.g., the image data and the position data of the fish 53a to 53c), and game space data (e.g., the terrain data including the ground 51, the pond 52, etc.).

The control data 61 is data representing an operation made on the controller 7, and is obtained from the controller 7. The control data 61 includes marker position data 611. The marker position data 611 represents the positions of the markers included in the captured image (marker positions). If two marker images are included in the captured image, two sets of coordinates representing the positions of the two marker images are stored as the marker position data 611. If only one marker image is included in the captured image, one set of coordinates representing the position of the marker image is stored as the marker position data 611. The control data 61 is obtained from the controller 7 at regular intervals, as described above, and the control data stored in the main memory 13 is updated with the newly obtained control data 61. Moreover, the control data 61 includes data representing the status of the control section 32 (i.e., data indicating whether or not each control switch of the control section 32 is being pressed) and data representing the detection results from the acceleration sensor 37.

The reference data 62 is data regarding the captured image when the controller 7 is in a reference state. The reference state of the controller 7 is determined by the player in the calibration process to be described later. The reference data 62 includes reference direction vector data 621, reference middle point position data 622 and minimum distance data 623. The reference direction vector data 621 represents a vector (reference direction vector) extending between two marker positions as obtained when the controller 7 is in the reference state. The reference middle point position data 622 represents the position of the middle point (reference middle point position) between two marker positions as obtained when the controller 7 is in the reference state. The minimum distance data 623 represents the minimum distance between an edge of the captured image and any of the two marker positions as obtained when the controller 7 is in the reference state (see FIG. 19 to be described later). The minimum distance data 623 represents two different minimum distances, including the minimum distance with respect to the x-axis direction in the xy coordinate system of the captured image, and the minimum distance with respect to the y-axis direction.

The pointed position calculation data 63 is data used for calculating the position pointed at by the controller 7. The pointed position calculation data 63 includes first middle point position data 631, direction vector data 632, rotation angle data 633, second middle point position data 634 and movement vector data 635. The first middle point position data 631 represents the position of the middle point (first middle point position) between two marker positions represented by the marker position data 611. The direction vector data 632 represents a vector (direction vector) extending between two marker positions represented by the marker position data 611. The rotation angle data 633 represents the angle between the current direction vector and the reference direction vector. The second middle point position data 634 represents a position (second middle point position) obtained by rotating the position of the first middle point position by the angle represented by the rotation angle data 633 about the center of the captured image. The movement vector data 635 is a vector (movement vector) representing the difference between the current second middle point position and the reference middle point position. The movement vector is a vector representing how far the current pointed position is with respect to the pointed position in the reference state.

The depth calculation data 64 is data used for calculating a depth value to be described later. The depth value is an indication of the position of the controller 7 in the forward/backward direction, and is a value corresponding to the distance from the controller 7 to the markers 8a and 8b. The depth calculation data 64 includes marker image interval data 641 and actual distance data 642. The marker image interval data 641 represents the distance (marker image interval) between two marker positions represented by the marker position data 611. The actual distance data 642 represents the distance (actual distance) from the controller 7 to the markers 8a and 8b.

The operation result data 65 represents the results of an operation on the controller 7, which are obtained from the pointed position calculation data 63 and the depth calculation data 64. The operation result data 65 includes pointed position data 651 and depth value data 652. The pointed position data 651 represents the pointed position on the screen. The video game device 3 calculates the pointed position data 651 by using the pointed position calculation data 63. The depth value data 652 is calculated by using the depth calculation data 64, and represents the depth value.

The cursor data 66 is data regarding the cursor displayed on the screen (the cursor 55 shown in FIG. 11, etc.). The cursor data 66 includes cursor screen position data 661. The cursor screen position data 661 represents the position of the cursor on the screen.

The object data 67 is data regarding the object controlled by the player (the fishing rod 54). The object data 67 includes object screen position data 671 and object space position data 672. The object screen position data 671 is two-dimensional coordinates representing the position of the fishing rod on the screen. The object space position data 672 is three-dimensional coordinates representing the position of the fishing rod in the game space.

The control flag data 68 is data representing the contents of the control flag. The control flag is a flag indicating whether or not the fishing rod is being controllable. Specifically, the control flag is ON when the fishing rod is controllable, and is OFF otherwise.

Figure 17:
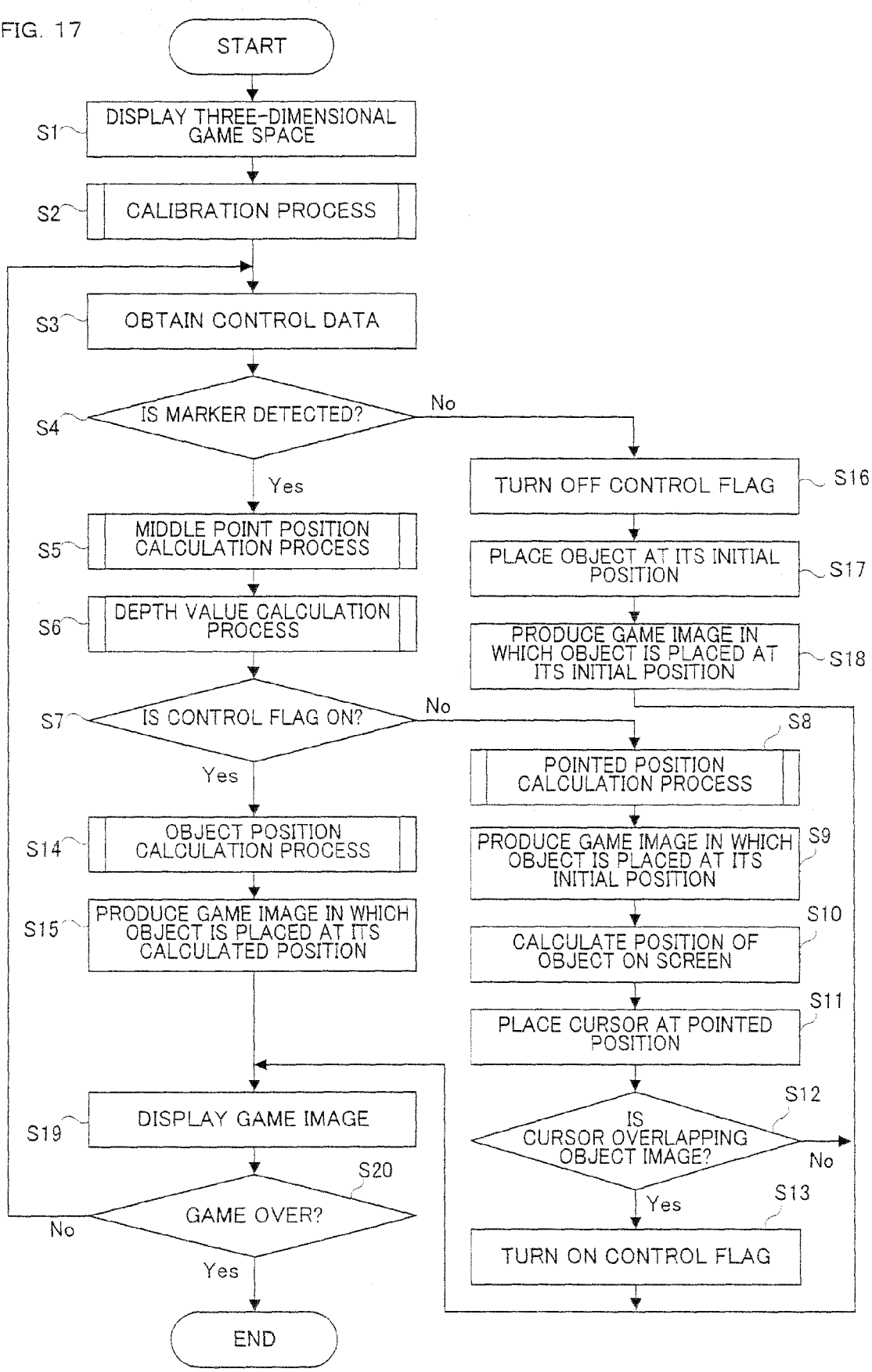
FIG. 17 is a flow chart showing the game process performed by the video game device 3.

Referring now to FIGS. 17 to 32, the details of the game process performed by the video game device 3 will be described. FIG. 17 is a flow chart showing the game process performed by the video game device 3. When the power of the video game device 3 is turned ON, the CPU 10 of the video game device 3 executes a boot program stored in a boot ROM (not shown), thus initializing various units such as the main memory 13. The video game program stored in the optical disk 4 is loaded to the main memory 13, and the CPU 10 starts executing the video game program. The flowchart of FIG. 17 shows the game process performed after the completion of the process described above. In the flow charts of FIGS. 17 to 32, parts of the game process related to the operation of moving the cursor or the fishing rod by using the controller 7 are shown in detail, and other parts of the game process that are not directly related to the present invention will not be shown in detail.

First, in step S1, a three-dimensional game space is created and displayed on the monitor 2. The CPU 10 creates a game space including the ground 51, the pond 52, etc. Moreover, the fish 53a to 53c are placed in the pond 52, and the fishing rod is placed at its predetermined initial position. The fishing rod is preferably placed so that the fishing rod is displayed near the center of the screen. A game image is produced from the created game space as viewed from the virtual camera in the viewing direction, and the produced game image is displayed on the monitor 2.

Figure 18:
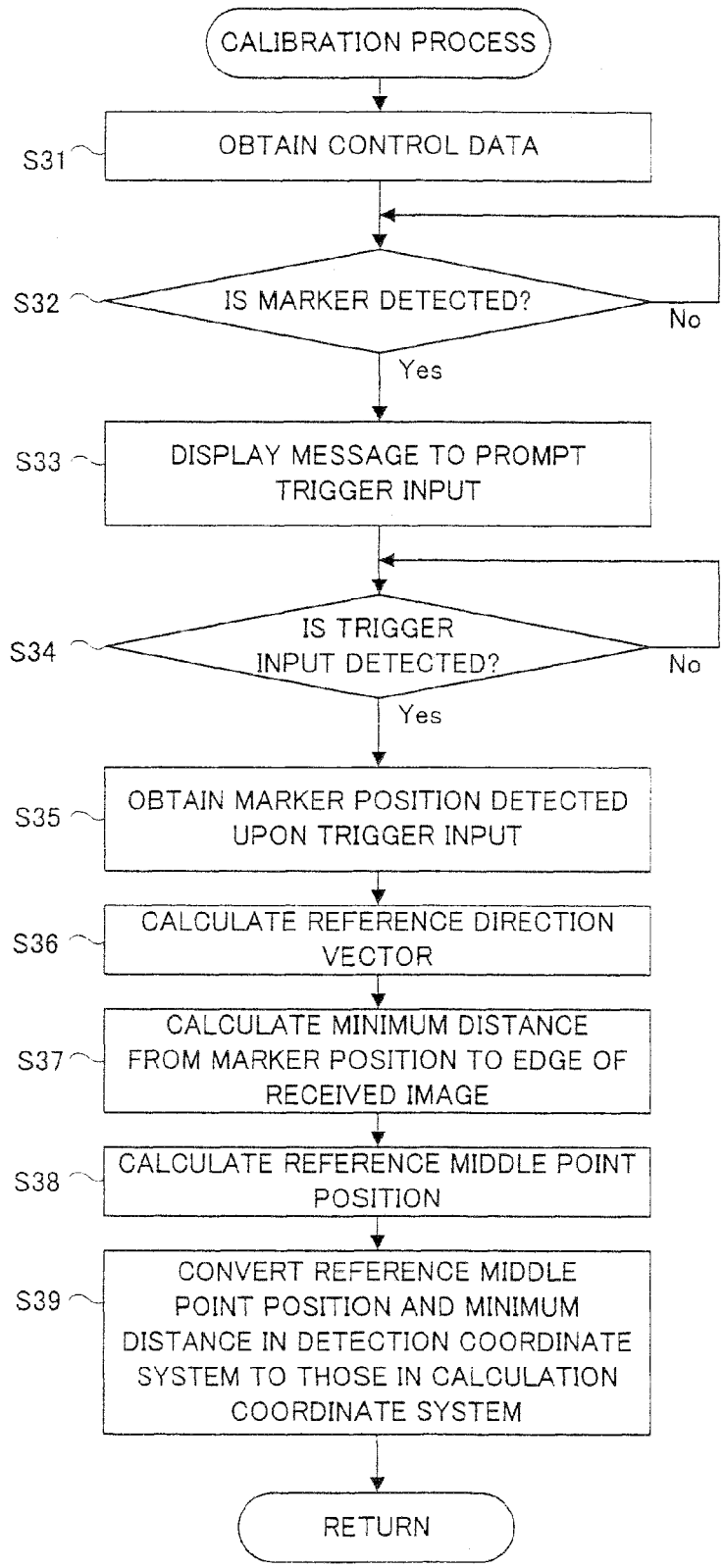
FIG. 18 is a flow chart showing the details of step S2 shown in FIG. 17.
Figure 19:
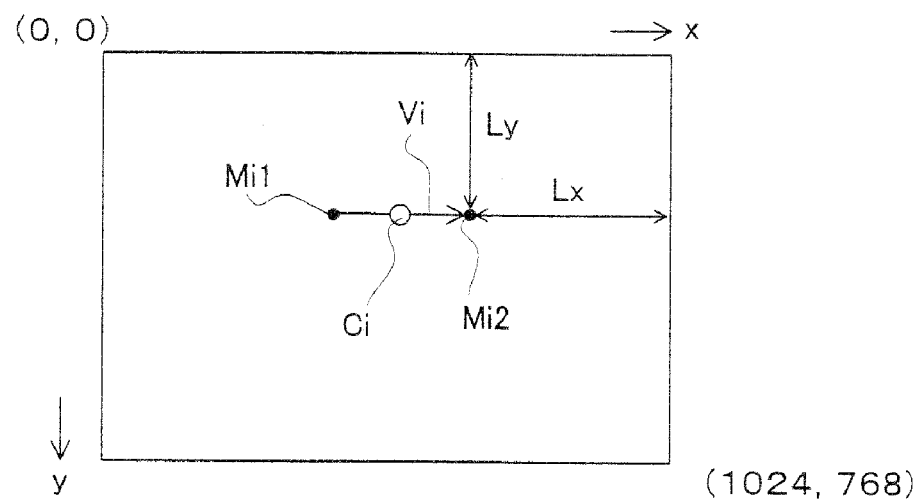
FIG. 19 shows a two-dimensional coordinate system of marker positions obtained at the time of a trigger input.
Figure 20:
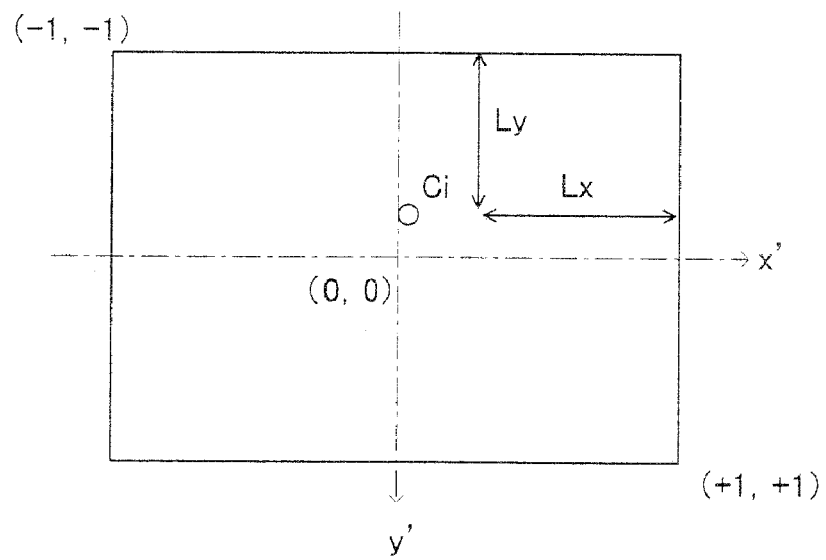
FIG. 20 shows a two-dimensional area on a captured image as represented in the calculation coordinate system.

Then, in step S2, the calibration process is performed. The calibration process is a process of allowing the player to set the reference state of the controller 7. Through this process, the reference state of the controller 7 is determined, and the reference data 62 is stored in the main memory 13. Referring now to FIGS. 18 to 20, the calibration process will be described.

FIG. 18 is a flow chart showing the details of step S2 shown in FIG. 17. First, in step S31 of the calibration process of step S2, the control data 61 is obtained from the controller 7. As described above, the control data 61 includes the marker position data 611. Then, in step S32, it is determined whether or not a marker is detected. Specifically, the CPU 10 determines whether or not the marker position data 611 included in the control data 61 obtained in step S31 represents one or two sets of coordinates. If the controller 7 is outside the controllable range and no marker is being detected, the marker position data 611 will contain no set of coordinates, indicating that no marker position is being detected. If the controller 7 is within the controllable range and one or more markers are being detected, the marker position data 611 will contain one or two sets of coordinates. If it is determined in step S32 that a marker is detected, the process proceeds to step S33. If not, the process of step S32 is repeated. Thus, the CPU 10 repeats step S32 until a marker is detected.

In step S33, the CPU 10 displays an image on the screen to prompt the player for a trigger input. A trigger input is made to determine the reference state of the controller 7, and is made by pressing the A button 32i of the controller 7 in the illustrated example. Specifically, in step S33, a prompt such as "Aim the controller at the center of the screen, and press A button" is displayed on the screen. In response to this prompt, the player presses the A button while aiming the controller 7 at the center of the screen. The position and direction of the controller 7 at the time when the player presses the A button are stored as the reference state.

Then, in step S34, it is determined whether or not a trigger input is detected. Specifically, the CPU 10 obtains the control data 61 from the controller 7, and determines whether or not there has been a trigger input on the A button 32i. If it is determined in step S34 that there is a trigger input, the process proceeds to step S35. If not, step S34 is repeated. Thus, the CPU 10 repeats step S34 until a trigger input is detected.

In step S35, the CPU 10 obtains the marker positions at the time of the trigger input. Specifically, the CPU 10 obtains the marker position data 611, which is contained in the control data 61 indicating that there has been a trigger input on the A button 32i. FIG. 19 shows a two-dimensional coordinate system of the marker positions obtained at the time of the trigger input. As shown in FIG. 19, each marker position is represented by a set of integer coordinates in the xy coordinate system ranging from (0,0) to (1024,768). In FIG. 19, two marker positions Mi1 and Mi2 are included in the captured image.

Then, in step S36, the CPU 10 calculates the reference direction vector based on the marker positions obtained in step S35. Specifically, the CPU 10 obtains, as the reference direction vector, a vector Vi extending between the marker positions Mi1 and Mi2, which are obtained in step S35 (see FIG. 19). Which one of the two marker positions Mi1 and Mi2 is the start or end point of the vector is determined based on a predetermined condition. The predetermined condition is not limited to any particular condition. For example, one of the two marker positions with a smaller x coordinate may be the start point with the other being the end point of the vector. The reference direction vector obtained in step S36 is stored in the main memory 13 as the reference direction vector data 621. The reference direction vector data 621 may be a two-dimensional vector specifying the start point and the end point of the reference direction vector, or may alternatively be a value representing the direction of the reference direction vector.

Then, in step S37, the CPU 10 calculates the minimum distance from a marker position to an edge of the captured image. Specifically, the CPU 10 calculates the distance from each marker position to an edge of the captured image for each of the x-axis direction and the y-axis direction. Then, the shortest distance for the x-axis direction and the shortest distance for the y-axis direction are selected as being minimum distances. Referring to FIG. 19, the CPU 10 calculates, for the x-axis direction, the distance from the marker position Mi1 to the right edge of the captured image (x=1024), the distance from the marker position Mi1 to the left edge of the captured image (x=0), the distance from the marker position Mi2 to the right edge of the captured image (x=1024), and the distance from the marker position Mi2 to the left edge of the captured image (x=0). Then, the shortest distance of all the distances calculated (the distance from the marker position Mi2 to the right edge of the captured image in the illustrated example) is determined to be the minimum distance Lx for the x-axis direction. Similarly, the minimum distance Ly for the y-axis direction is obtained. The minimum distance for the x-axis direction and that for the y-axis direction are stored in the main memory 13 as the minimum distance data 623.

Then, in step S38, the reference middle point position is calculated based on the marker positions obtained in step S35. Specifically, the CPU 10 obtains, as a reference middle point position Ci, the position of the middle point between the marker positions Mi1 and Mi2 obtained in step S35 (see FIG. 19). The reference middle point position obtained in step S38 is stored in the main memory 13 as the reference middle point position data 622.

Then, in step S39, the CPU 10 performs a coordinate system conversion. The coordinate system shown in FIG. 19, where a position can take integer coordinates ranging from (0,0) to (1024,768), is referred to as the detection coordinate system. In step S39, the CPU 10 converts the detection coordinate system to the calculation coordinate system. FIG. 20 shows a two-dimensional area on the captured image as represented in the calculation coordinate system. As shown in FIG. 20, the calculation coordinate system is a coordinate system (an x'y' coordinate system) where the center of the captured image is the origin with each coordinate ranging from −1 to 1 from edge to edge. The x' axis of the calculation coordinate system is in the same direction as the x axis of the detection coordinate system, and the y' axis of the calculation coordinate system is in the same direction as the y axis of the detection coordinate system. The CPU 10 converts the minimum distance calculated in step S37 and the value of the reference middle point position calculated in step S38 in the detection coordinate system to those in the calculation coordinate system. Then, the reference middle point position data 622 and the minimum distance data 623 stored in the main memory 13 are updated with the converted values. Note that step S39 is merely a conversion of coordinate system, and does not change the reference middle point position in the captured image. While the scale of the detection coordinate system varies depending on the resolution of the image capturing means, the calculation coordinate system is irrespective of the resolution of the image capturing means. Thus, by converting the detection coordinate system to the calculation coordinate system in step S39, the operation with the reference middle point position and the minimum distances can be performed independent of the resolution of the image capturing means. After step S39, the CPU 10 exits the calibration process. The calibration process may be omitted if the reference data 62 can be provided in advance. Alternatively, the interval between the markers 8a and 8b or the distance between the markers and the controller may be inputted.

Referring back to FIG. 17, the process proceeds to steps S3 to S20 after step S2. In steps S3 to S20, the player can control the cursor or the fishing rod. The loop through steps S3 to S20 is iterated once per frame.

First, in step S3, the control data 61 is obtained from the controller 7. As described above, the control data 61 includes the marker position data 611. Then, in step S4, it is determined whether or not a marker is detected. The determination process of step S4 is similar to that of step S32 described above. If it is determined in step S4 that a marker is detected, the process proceeds to step S5. If not, the process proceeds to step S16. Failing to detect a marker here means that the controller 7 is being outside the controllable range.

Figure 21:
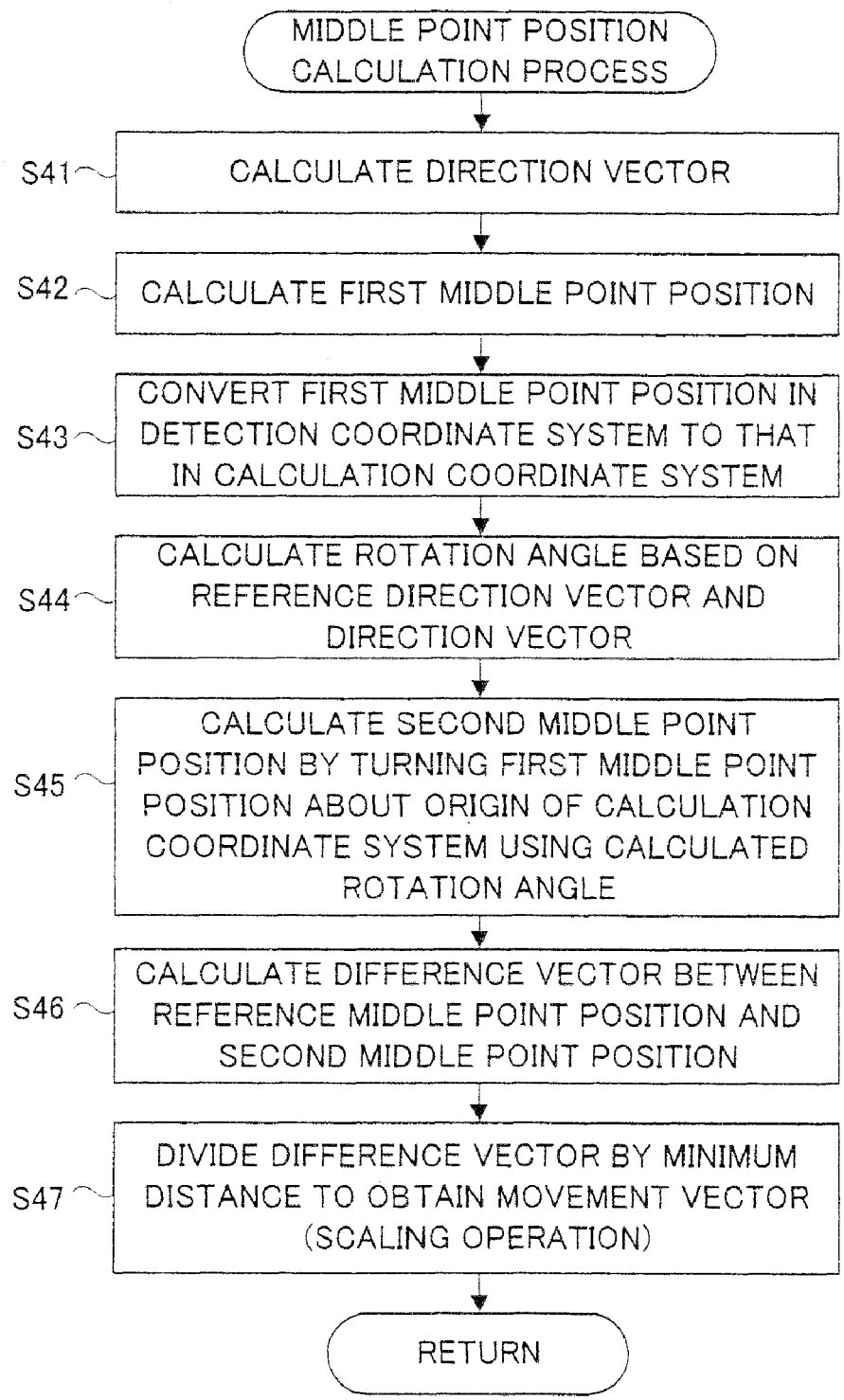
FIG. 21 is a flow chart showing the details of step S5 shown in FIG. 17.
Figure 22:
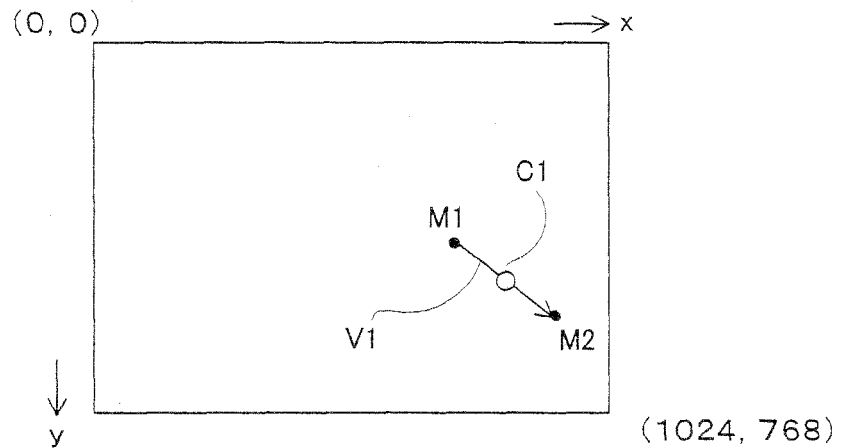
FIG. 22 shows the coordinate system (the detection coordinate system) of the marker positions obtained in step S3.

In step S5, the CPU 10 performs a middle point position calculation process. Referring now to FIGS. 21 to 27, the details of the middle point position calculation process will be described. FIG. 21 is a flow chart showing the details of step S5 shown in FIG. 17. FIG. 22 shows the coordinate system (the detection coordinate system) of the marker positions obtained in step S3. The process of step S5 will now be described, assuming that marker positions M1 and M2 as shown in FIG. 22 are obtained in step S3.

First, in step S41 of the middle point position calculation process of step S5, the CPU 10 calculates the direction vector based on the marker positions obtained in step S3. Specifically, the CPU 10 obtains, as the direction vector, a vector V1 extending between the marker positions M1 and M2 obtained in step S3 (see FIG. 22). Which one of the two marker positions M1 and M2 is the start or end point of the vector is determined based on a predetermined condition. The condition is the same as that used in step S36. The direction vector obtained in step S41 is stored in the main memory 13 as the direction vector data 632. The direction vector data 632 may be a two-dimensional vector specifying the start point and the end point of the direction vector, or may alternatively be a value representing the direction of the direction vector.

Then, in step S42, the CPU 10 calculates the first middle point position based on the marker positions obtained in step S3. Specifically, the CPU 10 obtains, as a first middle point position C1, the position of the middle point between the marker positions M1 and M2 obtained in step S3 (see FIG. 22). The first middle point position obtained in step S42 is stored in the main memory 13 as the first middle point position data 631. Then, in step S43, the CPU 10 converts the first middle point position in the detection coordinate system to that in the calculation coordinate system. Then, the first middle point position data 631 stored in the main memory 13 are updated with the converted values.

Then, in step S44, based on the direction vector obtained in step S41 and the reference direction vector obtained in step S2, the CPU 10 calculates the angle (rotation angle) θ between the reference direction vector and the direction vector. Specifically, the CPU 10 calculates the rotation angle θ by referring to the reference direction vector data 621 and the direction vector data 632 stored in the main memory 13. The obtained rotation angle θ is stored in the main memory 13 as the rotation angle data 633. The rotation angle θ is an indication of how much the controller 7 is turned from the reference state about an axis in the forward/backward direction. Therefore, by detecting the rotation angle θ, it is possible to detect the degree of rotation of the controller 7 about an axis in the forward/backward direction.

Figure 23:
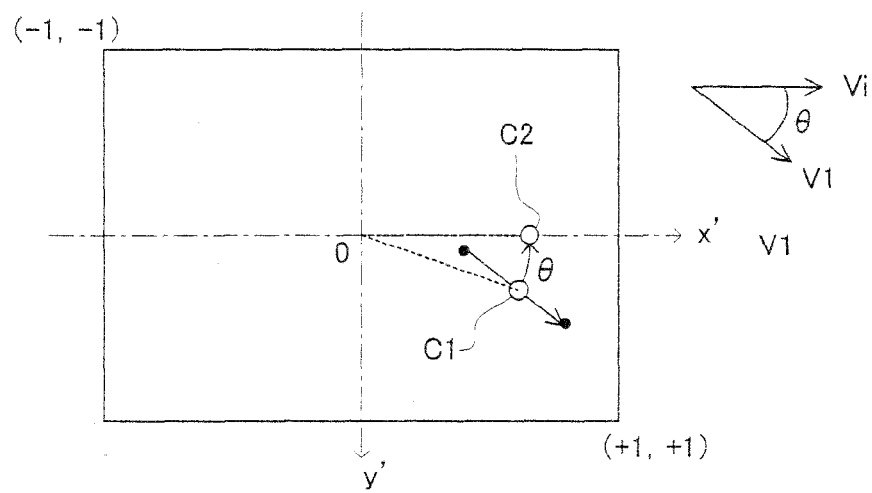
FIG. 23 illustrates the process of step S45 shown in FIG. 21.

Then, in step S45, the CPU 10 calculates the second middle point position based on the first middle point position obtained in step S43 and the rotation angle obtained in step S44. FIG. 23 illustrates the process of step S45 shown in FIG. 21. As shown in FIG. 23, a second middle point position C2 is calculated as being a position obtained by rotating the first middle point position C1 by the rotation angle θ about the center of the captured image (the origin of the calculation coordinate system). The obtained second middle point position is stored in the main memory 13 as the second middle point position data 634.

Therefore, even if the position pointed at by the controller 7 stays at the same point, the marker positions may vary depending on the rotation of the controller 7 about an axis in the forward/backward direction. Thus, it is not possible to calculate an accurate pointed position based on the first middle point position, which is simply calculated from the marker positions. In the present embodiment, through steps S44 and S45, the CPU 10 calculates the second middle point position by correcting the first middle point position while taking into account the rotation of the controller 7 about an axis in the forward/backward direction. Specifically, the CPU 10 calculates the degree of rotation of the controller 7 with respect to the reference state in step S44, and rotates the first middle point position depending on the degree of rotation in step S45, thereby correcting the shift in the middle point position occurring due to the rotation of the controller 7.

Figure 24:
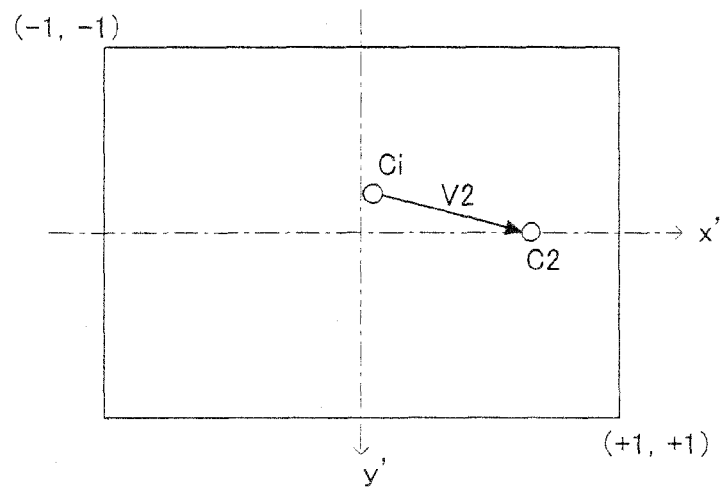
FIG. 24 illustrates the process of step S46 shown in FIG. 21.

In step S46, following step S45, the CPU 10 calculates a vector (difference vector) representing the difference between the reference middle point position and the second middle point position. FIG. 24 illustrates the process of step S46 shown in FIG. 21. As shown in FIG. 24, a difference vector V2 is a vector extending from the reference middle point position Ci to the second middle point position C2. The CPU 10 calculates the difference vector by referring to the reference middle point position data 622 and the second middle point position data 634 stored in the main memory 13.

Figure 25:
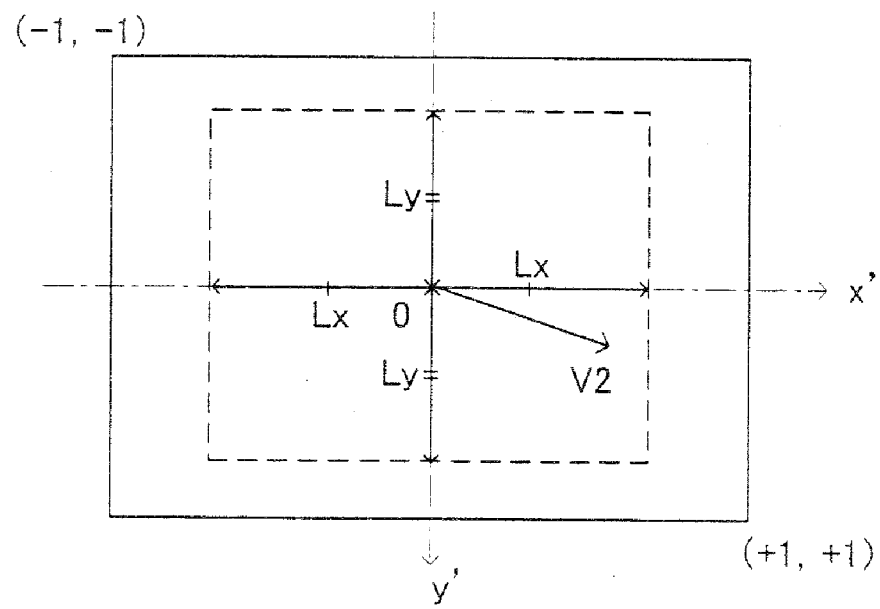
FIG. 25 illustrates the process of step S47 shown in FIG. 21.
Figure 26:
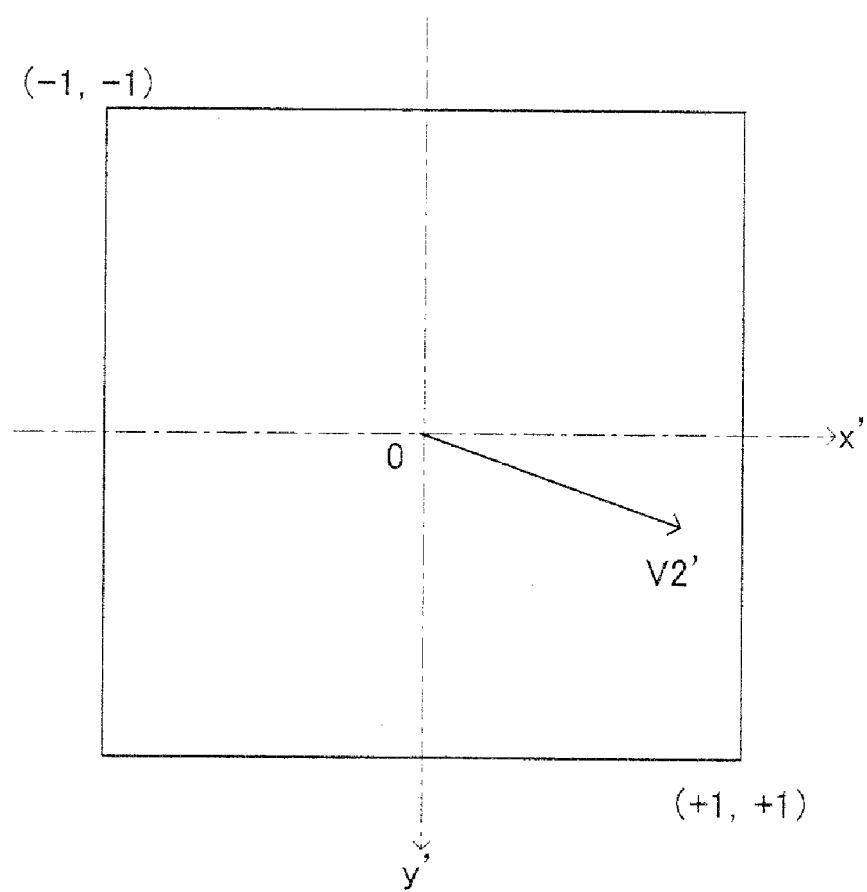
FIG. 26 illustrates the process of step S47 shown in FIG. 21.

Then, in step S47, the CPU 10 performs a scaling operation on the difference vector calculated in step S46. Specifically, the CPU 10 divides the x'-axis component of the difference vector by the minimum distance Lx for the x'-axis direction, and the y'-axis component of the difference vector by the minimum distance Ly for the y'-axis direction. FIG. 25 illustrates the process of step S47 shown in FIG. 21. FIG. 25 shows a variation in the x'y' coordinate system with the magnitude of the difference vector before the scaling operation and that after the scaling operation being equal to each other. Through the scaling operation, the magnitude of the difference vector is varied so that the area within a dotted-line boundary in FIG. 25 is where $-1 \leq x' \leq 1$ and $-1 \leq y' \leq 1$ hold true. Thus, a scaling operation on the difference vector shown in FIG. 24 yields a vector V2' shown in FIG. 26. The CPU 10 takes the vector V2' obtained by the scaling operation as the movement vector, and stores the vector V2' in the main memory 13 as the movement vector data 635. After step S47, the CPU 10 exits the middle point position calculation process.

Figure 27:
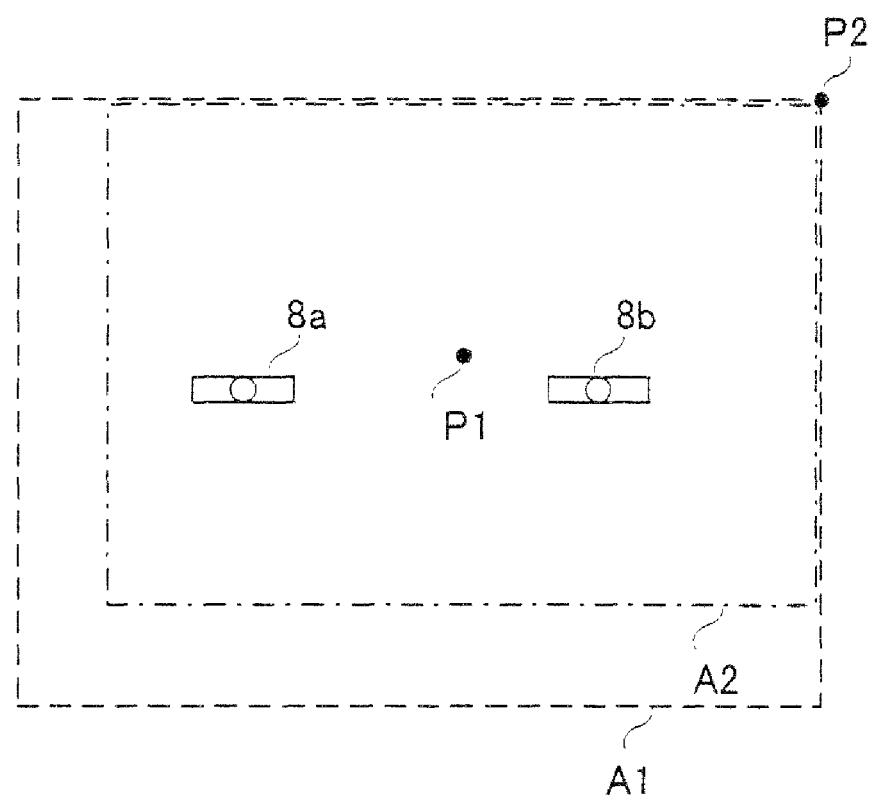
FIG. 27 shows the relationship between a controllable range and a difference vector.

FIG. 27 shows the relationship between the controllable range and the difference vector. In FIG. 27, a dotted-line area A1 represents the range of the pointed position where the controller 7 is within the controllable range. Moreover, a position P1 is the pointed position in the reference state. A one-dot-chain-line area A2 represents the range of the pointed position where the movement vector obtained by the scaling operation satisfies $-1 \leq x' \leq 1$ and $-1 \leq y' \leq 1$. It can be seen from FIG. 27 that in the range where the movement vector satisfies $-1 \leq x' \leq 1$ and $-1 \leq y' \leq 1$, the controller 7 is within the controllable range and the controllable range can be used effectively. Therefore, the controllable range can be used effectively by using the movement vector for controlling an object in the range where $-1 \leq x' \leq 1$ and $-1 \leq y' \leq 1$. In a case where the object moving range is limited, the movement vector and the object moving-range can easily be associated with each other by associating the moving range with the range where the movement vector satisfies $-1 \leq x' \leq 1$ and $-1 \leq y' \leq 1$.

Figure 28:
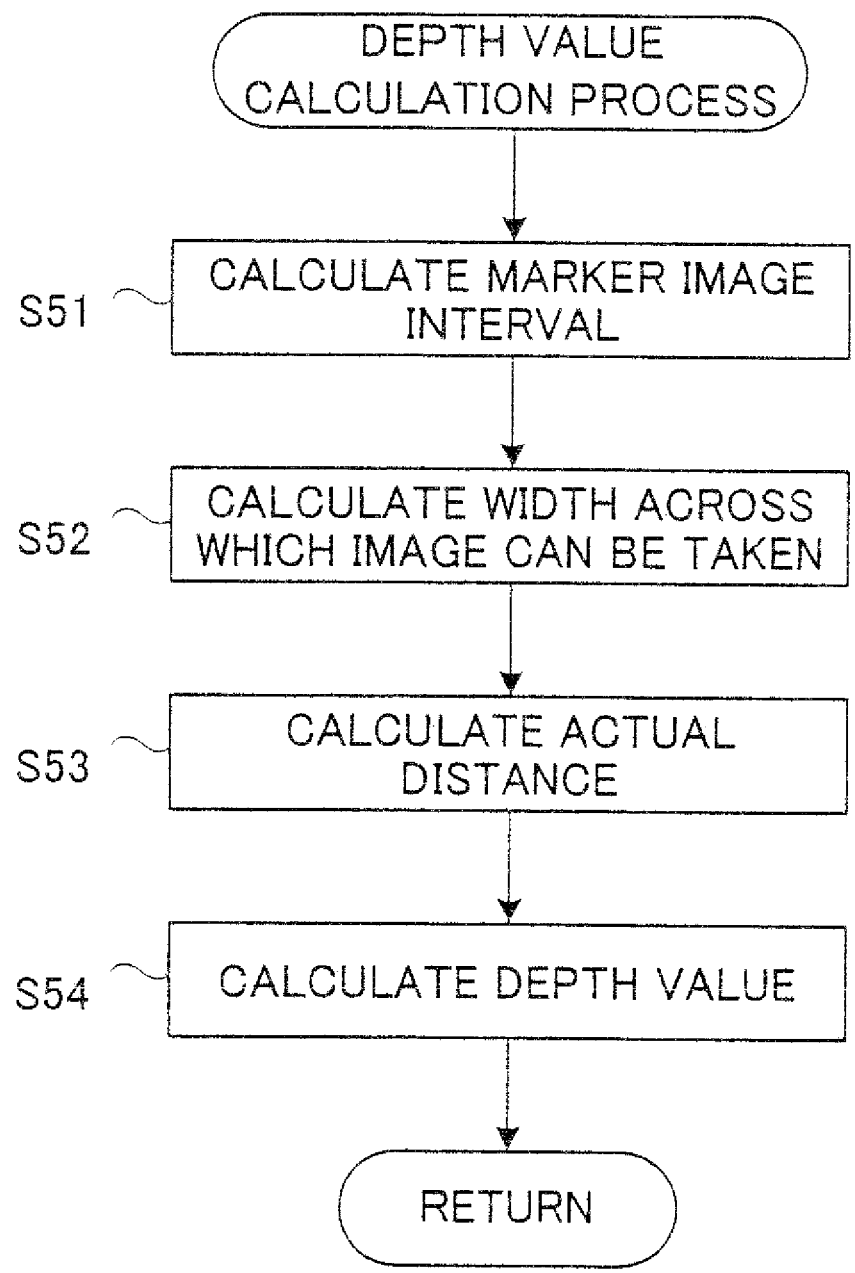
FIG. 28 is a flow chart showing the details of step S6 shown in FIG. 17.
Figure 29A:
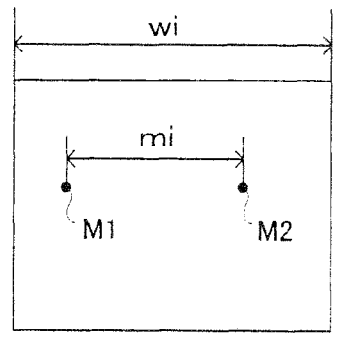
FIGS. 29A and 29B illustrate the process of step S6 shown in FIG. 17.
Figure 29B:
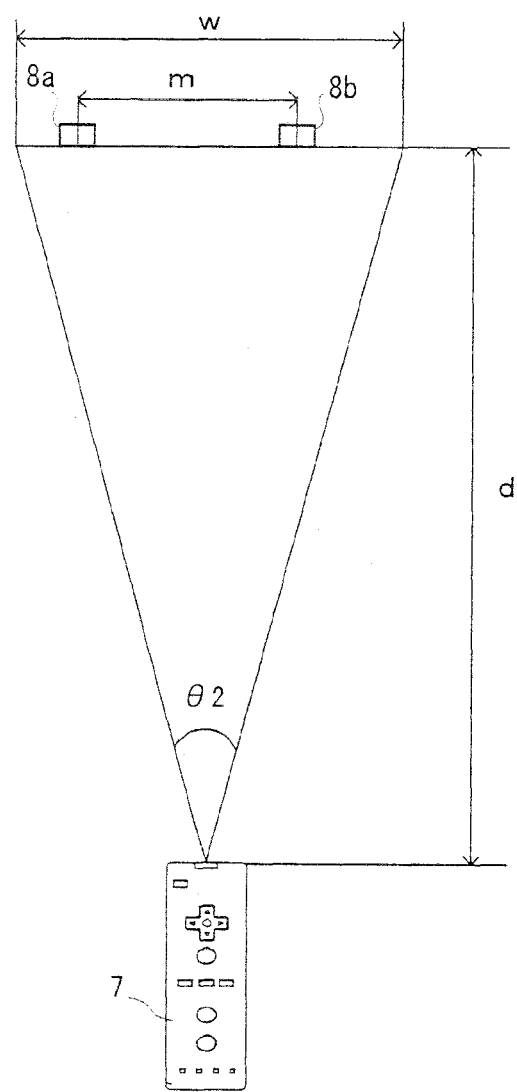

Referring back to FIG. 17, in step S6, following step S5, a depth value calculation process is performed. Referring now to FIGS. 28, 29A and 29B, the details of the depth value calculation process will be described. FIG. 28 is a flow chart showing the details of step S6 shown in FIG. 17. FIGS. 29A and 29B illustrate the process of step S6 shown in FIG. 17.

First, in step S51 of the depth value calculation process of step S6, the CPU 10 calculates a marker image interval mi (see FIG. 29A) based on the marker positions obtained in step S3. Specifically, the CPU 10 calculates the distance mi between the two marker positions M1 and M2 obtained in step S3. The obtained distance is stored in the main memory 13 as the marker image interval data 641.

Then, in step S52, the CPU 10 calculates the width w (see FIG. 29B) across which the image sensing device 40 can take an image, with respect to the positions where the markers 8a and 8b are installed. Specifically, the CPU 10 calculates the width w as follows.

$$w = wi \times m/mi$$

In the expression, m is the interval between the markers 8a and 8b (e.g., 30 cm), and is a fixed value. Moreover, wi is the width of the captured image of the image sensing device 40 for the width w, and is also a fixed value. Since the interval m and the width wi are both fixed values, they are stored in advance in the storage means of the video game device 3. The interval m may be any suitable value depending on the environment in which the markers 8a and 8b are installed by the player. The interval between the installed markers 8a and 8b may be inputted by the player as the interval m.

Then, in step S53, the CPU 10 calculates the distance d between the markers 8a and 8b and the image sensing device 40 (the controller 7) based on the width w and the viewing angle θ2 of the image sensing device 40. Specifically, the CPU 10 calculates the distance d as follows.

$$\tan(\theta 2/2) = (w/2)/d = w/2d$$

Since the viewing angle θ2 is a fixed value, it is stored in advance in the storage means of the video game device 3. The obtained distance d is stored in the main memory 13 as the actual distance data 642.

Then, in step S54, the CPU 10 calculates the depth value corresponding to the distance d. The depth value is calculated to be larger as the distance d is larger. There may be an upper limit and a lower limit for the depth value. The obtained depth value is stored in the main memory 13 as the depth value data 652. After step S54, the CPU 10 exits the depth value calculation process.

Referring back to FIG. 17, in step S7, following step S6, it is determined whether or not the control flag is ON. The determination process of step S7 is for determining whether or not the controlled object (fishing rod) is being controllable. Specifically, the CPU 10 refers to the control flag data 68 stored in the main memory 13 to determine whether or not the control flag is ON. If it is determined that the control flag is ON, i.e., if the object is being controllable, the process proceeds to steps S14 and S15. If the control flag is OFF, i.e., if the object is not being controllable, the process proceeds to steps S8 to S13. Specifically, step S8 is performed while the player is controlling the cursor displayed on the screen (FIG. 11), and step S14 is performed after the player has aligned the cursor with the object (FIGS. 13 and 14).

Figure 30:
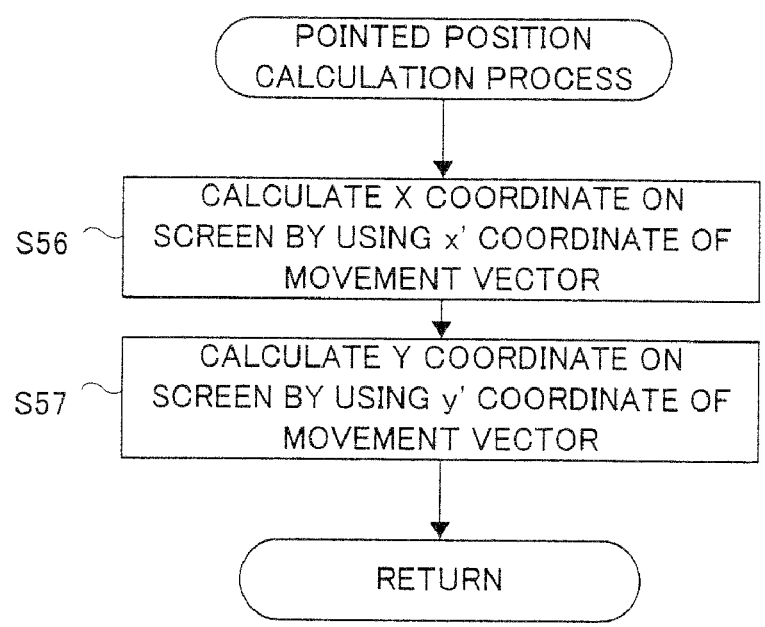
FIG. 30 is a flow chart showing the details of step S8 shown in FIG. 17.
Figure 31A:
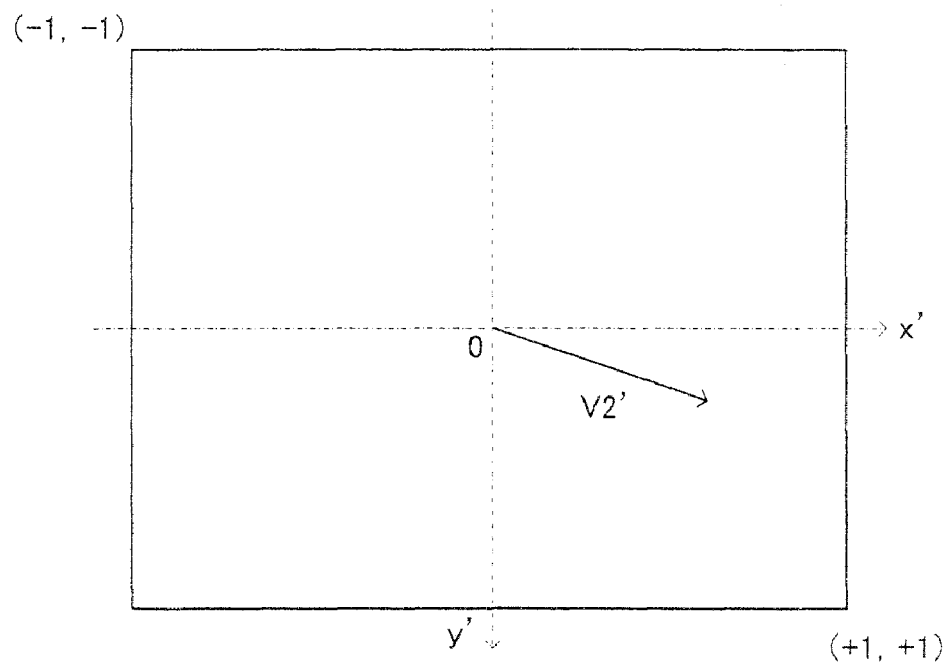
FIGS. 31A and 31B illustrate the process of step S8 shown in FIG. 17.
Figure 31B:
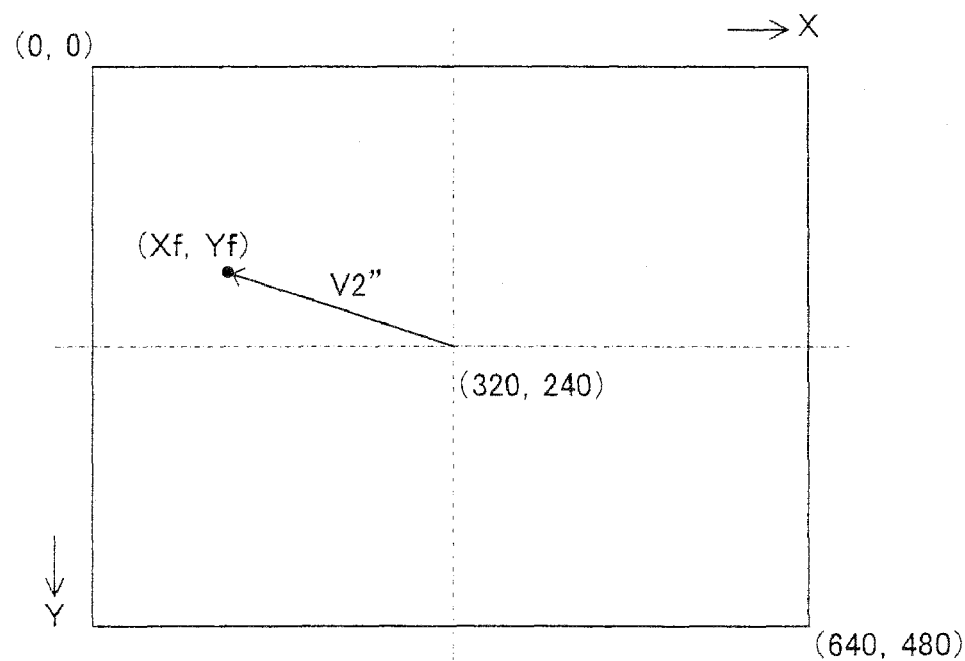

First, steps S8 to S13 will be described. In steps S8 to S13, the player moves the cursor on the screen by using the controller 7. In step S8, the pointed position calculation process is performed. Referring now to FIGS. 30, 31A and 31B, the details of the pointed position calculation process will be described. FIG. 30 is a flow chart showing the details of step S8 shown in FIG. 17. FIGS. 31A and 31B illustrate the process of step S8 shown in FIG. 17. Note that it is assumed herein that the coordinate system for representing a position on the screen is an XY coordinate system, as shown in FIG. 31A. The XY coordinate system is a coordinate system where the upper left corner of the screen is the origin, the rightward direction of the screen is the positive X-axis direction, and the downward direction of the screen is the positive Y-axis direction. In the XY coordinate system, a position can take integer coordinates ranging from (0,0) to (640,480).

First, referring to FIGS. 31A and 31B, the pointed position calculation process will be outlined. FIG. 31A shows an example of the movement vector V2, obtained in step S5. If a movement vector as shown in FIG. 31A is obtained, the pointed position (Xf,Yf) is calculated to be the position as shown in FIG. 31B. A vector V2" shown in FIG. 31B is obtained by V2"=−V2'×320. Thus, the pointed position is obtained by moving from the center of the screen (320,240) by the vector V2".

First, in step S56 of the pointed position calculation process, the CPU 10 calculates the X coordinate on the screen based on the x' coordinate of the movement vector obtained in step S5. Specifically, the CPU 10 refers to the movement vector represented by the movement vector data 635 stored in the main memory 13, and calculates the X coordinate Xf of the pointed position as follows.

$$Xf = -xf \times 320 + 320$$

In this expression, xf is the x' coordinate of the movement vector. The x' coordinate of the movement vector may take a value smaller than −1 or a value larger than 1 depending on the reference state of the controller 7 determined in step S2. If the x' coordinate is smaller than −1, the CPU 10 calculates the above expression with the x' coordinate being −1. If the x' coordinate is larger than 1, the CPU 10 calculates the above expression with the x' coordinate being 1.

Then, in step S57, the CPU 10 calculates the Y coordinate on the screen based on the y' coordinate of the movement vector obtained in step S5. Specifically, the CPU 10 refers to the movement vector represented by the movement vector data 635 stored in the main memory 13, and calculates the Y coordinate Yf of the pointed position as follows.

$$Yf=-yf\times 240+240$$

In this expression, yf is the y' coordinate of the movement vector. The calculation is similar to that in step S56. If the y' coordinate is smaller than −1, the CPU 10 calculates the above expression with the y' coordinate being −1. If the y' coordinate is larger than 1, the CPU 10 calculates the above expression with the y' coordinate being 1.

The pointed position (Xf,Yf) is calculated through steps S56 and S57 as described above. The obtained the pointed position is stored in the main memory 13 as the pointed position data 651. After steps S56 and S57, the CPU 10 exits the pointed position calculation process.

Referring back to FIG. 17, in step S9, following step S8, a game space image is produced where the fishing rod is placed in its predetermined initial position. The CPU 10 produces the game space image as viewed from the virtual camera. Then, in step S10, the CPU 10 calculates the display position of the fishing rod on the screen. The display position of the fishing rod is obtained by calculating the position in the three-dimensional game space as being projected onto a projection plane, and then converting the position on the projection plane to a corresponding position on the screen. The position of the fishing rod on the screen is stored in the main memory 13 as the object screen position data 671. In the present embodiment, the position of the fishing rod on the screen is constant at the time of step S10. Therefore, coordinates of the constant position may be stored in advance, and step S10 may be skipped.

Then, in step S11, the CPU 10 places the cursor at the pointed position as obtained in step S9. Specifically, the CPU 10 updates the cursor screen position data 661 stored in the main memory 13 with the pointed position data 651. Then, the CPU 10 produces a game image by laying a cursor image at the pointed position over the game image as produced in step S9. The produced game image is displayed on the screen in the display process to be described later.

Then, in step S12, it is determined whether or not the position of the cursor coincides with the position of the fishing rod on the screen. Specifically, the CPU 10 refers to the cursor screen position data 661 and the object screen position data 671 stored in the main memory 13, and determines whether or not the position of the cursor on the screen is within a predetermined distance from the position of the fishing rod on the screen. If so, it is determined that the position of the cursor coincides with the position of the fishing rod on the screen. If it is determined in step S12 that the cursor position coincides with the position of the fishing rod on the screen, the process proceeds to step S13. If it is determined that the cursor position does not coincide with the position of the fishing rod on the screen, the process proceeds to step S19, skipping step S13.

In step S13, the control flag is turned ON. Specifically, the CPU 10 sets the control flag data 68 stored in the main memory 13 so that it indicates ON. Then, after step S13 and until the controlled object flag is turned OFF, the player can control the controlled object by using the controller 7. After step S13, the process proceeds to step S19 to be described later.

Steps S14 and S15 will now be described. In steps S14 and S15, the player uses the controller 7 to move the object (fishing rod) in the game space. In step S14, the CPU 10 performs an object position calculation process.

Figure 32:
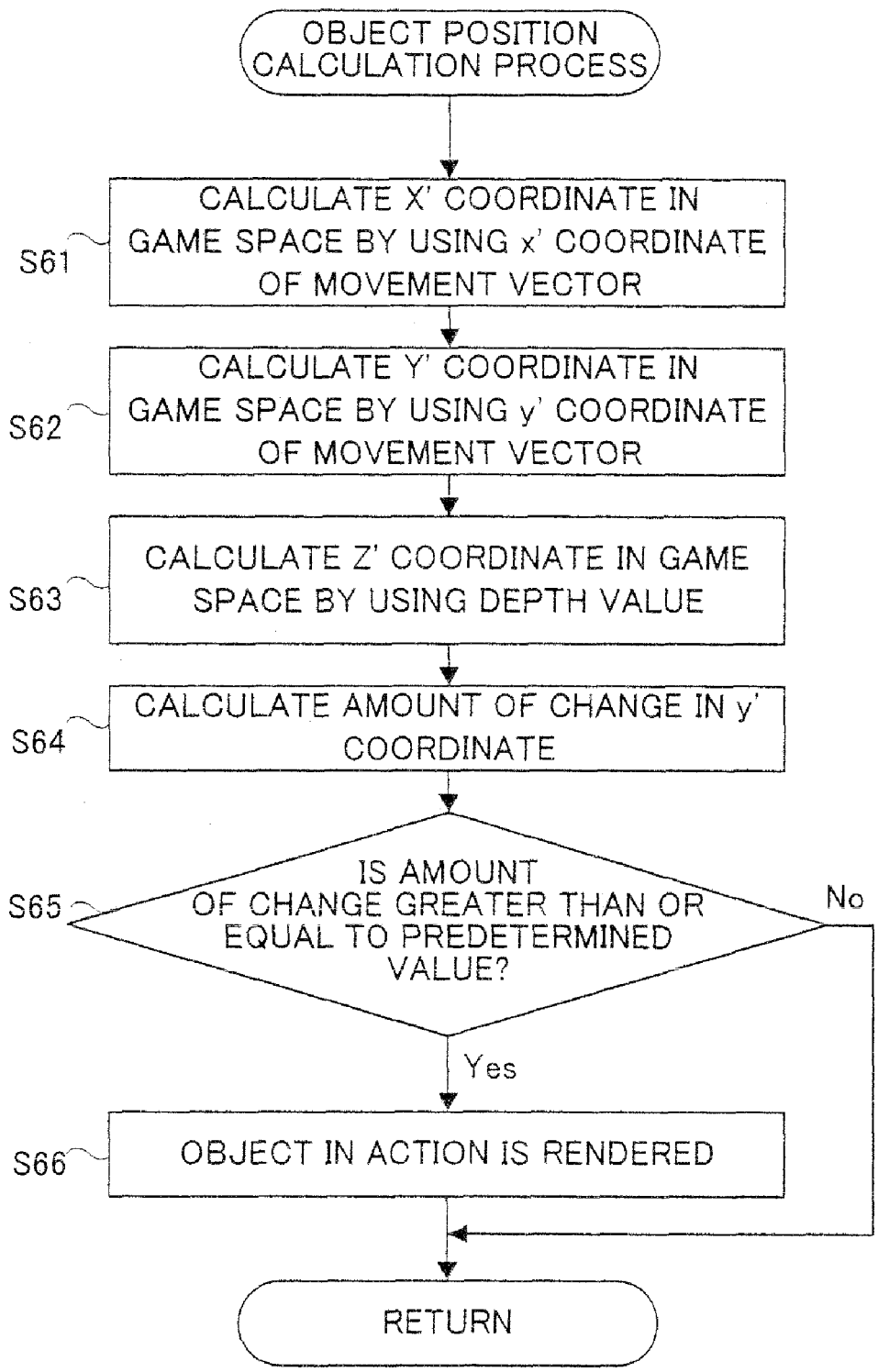
FIG. 32 is a flow chart showing the details of step S14 shown in FIG. 17.

FIG. 32 is a flow chart showing the details of step S14 shown in FIG. 17. First, in step S61 of the object position calculation process, the CPU 10 calculates the X' coordinate of the X'Y'Z' coordinate system (see FIG. 15) of the game space based on the x' coordinate of the movement vector obtained in step S5. Specifically, the CPU 10 refers to the movement vector represented by the movement vector data 635 stored in the main memory 13, and calculates the X' coordinate Ox of the object position as follows.

$$Ox=xf\times\alpha+a$$

In this expression, xf is the x' coordinate of the movement vector, and $\alpha$ and a are each a predetermined constant. As in steps S56 and S57, the CPU 10 may calculate the above expression while limiting the x' coordinate within the range of $-1\leq xf\leq 1$. Specifically, the CPU 10 may calculate the above expression with the x' coordinate being −1 when it is smaller than −1 and with the x' coordinate being 1 when it is larger than 1.

Then, in step S62, the CPU 10 calculates the Y' coordinate of the X'Y'Z' coordinate system (see FIG. 15) the game space based on the y' coordinate of the movement vector obtained in step S5. Specifically, the CPU 10 refers to the movement vector represented by the movement vector data 635 stored in the main memory 13, and calculates the Y' coordinate Oy of the object position as follows.

$$Oy=yf\times\beta+b$$

In this expression, yf is the y' coordinate of the movement vector, and $\beta$ and b are each a predetermined constant. As in step S61, the CPU 10 may calculate the above expression while limiting the y' coordinate within the range of $-1\leq yf\leq 1$.

Then, in step S63, the CPU 10 calculates the Z' coordinate of the X'Y'Z' coordinate system (see FIG. 15) of the game space based on the depth value obtained in step S6. Specifically, the CPU 10 refers to the depth value data 652 stored in the main memory 13, and calculates the Z' coordinate Oz of the object position as follows.

$$Oz=zf\times\gamma+c$$

In this expression, zf is the depth value, and $\gamma$ and c are each a predetermined constant. The position of the fishing rod in the game space is calculated through steps S61 to S63 as described above. The obtained coordinates in the X'Y'Z' coordinate system are stored in the main memory 13 as the object space position data 672.

After step S63, in steps S64 to S66, a process for allowing the player to pull up the fishing rod is performed. This action is performed in order to take in a fish being hooked. The player can take in the fish by doing this action while the fish is hooked. In the present embodiment, this action is activated when the position pointed at by the controller 7 moves in the up/down direction of the screen at a predetermined speed or higher.

In step S64, the CPU 10 calculates the amount by which the y' coordinate of the movement vector has changed from the previous value. Specifically, the CPU 10 calculates the difference between the y' coordinate of the movement vector in the previous frame and that in the current frame. Then, in step S65, it is determined whether or not the amount of change is greater than or equal to a predetermined value. If so, the process proceeds to step S66. In step S66, the action of pulling up the fishing rod is rendered. A few-frame-long animation of this action is rendered on the screen in the display process to be described later. If the amount of change is smaller than the predetermined value, the CPU 10 exits the object position calculation process, skipping step S66.

Referring back to FIG. 17, in step S15, following step S14, a game space image is produced where the fishing rod is placed at the position calculated in step S14. The CPU 10 produces the game space image as viewed from the virtual camera. Then, in the display process of step S19 to be described later, the fishing rod will be displayed on the screen as being moved to the position specified by the player using the controller 7. Since the cursor is not displayed in steps S14 and S15, the cursor will not appear during frames in which steps S14 and S15 are performed. After step S15, the process proceeds to step S19 to be described later.

Steps S16 to S18 will now be described. Steps S16 to S18 are performed if the controller 7 goes outside the controllable range while controlling the cursor or the fishing rod, i.e., if the determination result is negative in step S4. First, in step S16, the control flag is turned OFF. Specifically, the CPU 10 sets the control flag data 68 stored in the main memory 13 so that it indicates OFF. Then, after step S16 and until the controlled object flag is turned ON, the player cannot control the controlled object by using the controller 7.

Then, in step S17, the fishing rod is placed in its initial position in the game space. Specifically, the CPU 10 updates the object space position data 672 stored in the main memory 13 with the predetermined initial position. Thus, when the controller 7 goes outside the controllable range, the fishing rod returns to its initial position. Then, in step S18, a game space image is produced where the fishing rod is placed at the position calculated in step S17. After step S18, the process proceeds to step S19.

In step S20, the game image produced in step S11, S15 or S19 is displayed on the screen of the monitor 2. Then, in step S20, the CPU 10 determines whether or not the game is over. The determination of step S20 is based on, for example, whether the player has completed the game (whether the player has taken all the fish) or whether a time limit has elapsed in a case where such a time limit is set in the game. If it is determined in step S20 that the game is not over, the process returns to step S3 to repeat the loop through steps S3 to S20 until it is determined that the game is over. If it is determined that the game is over, the CPU 10 exits the game process shown in FIG. 17.

If there is only one marker position represented by the marker position data obtained in step S3, the first middle point position cannot be calculated in step S5. In such a case, the other marker position is estimated based on the direction vector data 632 from the previous frame. Specifically, if the detected marker position is (1000,500) and the direction vector from the previous frame is (100,0), the other marker position can be estimated to be (1100,500). Thus, the other, undetected marker position can be calculated with some accuracy. Therefore, even if only one marker is detected by the image capturing/processing section 35, it is possible to calculate the first middle point position. However, the marker position estimation is not performed if only one marker position is detected in the current frame and if none was detected in the previous frame. This is because an accurate estimation cannot be done in such a case.

In the present embodiment, it is determined that the position of the marker object in the captured image (the second middle point position in the embodiment) can be calculated if the image capturing/processing section 35 of the controller 7 can detect at least one marker. In other embodiments, it may be determined that the position of the marker object can be calculated only if two markers are detected. Specifically, step S5 may be performed only if it is determined in step S4 that two marker positions are detected.

In the present embodiment, the fishing rod is returned to its initial position when the image capturing/processing section 35 of the controller 7 fails to detect the marker. In other embodiments, instead of returning the fishing rod to the initial position immediately after the marker detection first fails, the fishing rod may be returned to the initial position only if the marker detection continues to fail over a predetermined period of time. In the present fishing video game, the player may rapidly jerk the controller 7 to move the pointed position up and down in order to pull up the fishing rod, in which case the controller 7 may go outside the controllable range. If the fishing rod is returned to the initial position immediately after the controller 7 goes outside the controllable range, it will be difficult for the player to do the pull-up action, degrading the controllability for the player. The controllability can be improved if the position of the fishing rod is kept unchanged even when the controller 7 goes outside the controllable range for a short period of time for the pull-up action.

In the present embodiment, before the player controls the controlled object, the image of the fishing rod being the controlled object is displayed at or near the center of the screen. Then, the player is allowed to move the cursor to align the cursor with the image of the fishing rod so that the player can check the pointed position. In other embodiments, the player may align the cursor with any other suitable image, instead of the controlled object itself, as long as the player can check the pointed position. For example, a symbol image may be displayed at or near the center of the screen, and the player may align the cursor with the symbol image. Moreover, the display position of the symbol image is not limited to the center of the screen, but may be anywhere on the screen. The video game device may erase the symbol image when the cursor reaches a predetermined area including at least a part of the symbol image. Thus, after the player starts controlling the object (fishing rod), the symbol image, which is no longer needed, will not be displayed on the screen, which is preferable for the player.

Where the symbol image is displayed as a target with which the cursor is to be aligned, the fishing rod does not have to be displayed at or near the center of the screen before the player starts controlling the fishing rod. Then, even when the controller 7 goes outside the controllable range while the player is controlling the fishing rod, the fishing rod does not have to be returned to the center of the screen. For example, the video game device 3 can leave the fishing rod where it was immediately before the controller 7 went outside the controllable range. When the fishing rod is uncontrollable, the fishing rod may be visually altered to indicate to the player that the fishing rod is being uncontrollable (e.g., by altering the color or shape of the fishing rod).

In the present embodiment, the three (XYZ) components obtained according to the movement of the controller 7 are given directly to the coordinates of the object in the game space so as to move the object. Alternatively, the vector V2 or the vector V2' described above with reference to FIGS. 26, 31A and 31B may be used as a direction input of a so-called "analog stick". In a conventional video game program using an analog stick, the tilt direction and the tilt amount of the analog stick are passed, as an analog stick input, to the video game program. Based on the current position and direction of the character in the game space and based on the received tilt direction and the tilt amount, the video game program determines the distance by which the character is moved and the direction in which it is moved. In the present embodiment, the vector V2" shown in FIG. 31B is used, instead of the tilt direction and the tilt amount of the analog stick. Thus, with respect to the current position of the character, the direction in which the character is moved and the amount by which it is moved are determined based on the vector V2". Therefore, while the controller 7 is within the controllable range, the player can move the controller 7 left, right, up and down to move the character in the game space based on a vector calculated according to the movement of the controller 7. In this case, however, since the movement of the controller 7 is used as an analog stick input, the pointed position based on the controller 7 may not coincide with the display position of the character. Thus, similar problems to those set forth above may occur. Nevertheless, the present invention can be applied to address the problems.

Specifically, the video game device 3 displays an alignment marker image, with which the cursor is to be aligned, at or near the center of the screen. Then, the cursor is displayed at the position pointed at by the controller 7 as described above. The alignment marker image may be an image of the player character itself, or may alternative be another image. When the player has aligned the cursor with the alignment marker image or moved the cursor nearby, the player is allowed to control the player character by using the controller 7. Through this operation, the player will know the pointed position before the player starts controlling the player character.

The present invention can be used in a video game system, etc., with an objective of improving the controllability of an object using an optical pointing device, or the like.

While the invention has been described in detail, the foregoing description is in all aspects illustrative and not restrictive. It is understood that numerous other modifications and variations can be devised without departing from the scope of the invention.

What is claimed is:

1. A method of using a remote control comprising an image sensor disposed on a front end portion thereof, the method comprising:
setting a reference point and a reference direction based on a calibration;
detecting at the image sensor first and second markers produced by a light source;
calculating a first middle point based on the detecting of the first and second markers;
calculating a second middle point based on the first middle point and an angle between the reference direction and a direction from the first detected marker to the second detected marker;
calculating a position pointed to by the remote control based on a difference vector between the reference point and the second middle point; and
generating an image signal for an image based at least in part on the pointed-to position,
wherein the calibration comprises detecting at the image sensor the first and second markers when the remote control points to a calibration pointing position and the reference point is a middle point calculated based on the detecting of the first and second markers during the calibration.

2. The method according to claim 1, wherein the light source comprises at least two spaced-apart light-emitting diodes.

3. The method according to claim 2, wherein the light-emitting diodes are spaced-apart in a substantially horizontal direction.

4. The method according to claim 1, further comprising:
transmitting signals indicative of the detected first and second markers from the remote control to a computer which performs the first middle point calculating, the second middle point calculating, the pointed-to position calculating and the image signal generating.

5. The method according to claim 4, wherein the transmitted signals are transmitted wirelessly.

6. The method according to claim 1, wherein the calibration further comprises determining a direction from the first marker to the second marker when the remote control points to the calibration pointing position and the reference direction corresponds to the determined direction.

7. The method according to claim 1, further comprising:
storing, in a memory, data indicative of the reference point and the reference direction.

8. The method according to claim 1, wherein the reference direction is substantially horizontal.

9. A method comprising using a remote control according to the method of claim 1 while playing a video game.

10. The method of claim 9, wherein the video game comprises a fishing game.

11. A non-transitory computer readable medium storing computer readable instructions that, when executed, cause a processor to perform operations comprising:
setting a reference point and a reference direction based on a calibration for a remote control;
receiving data indicative of first and second markers produced by a light source which are detected by an image sensor disposed on a front end portion of the remote control;
calculating a first middle point based on the detecting of the first and second markers;
calculating a second middle point based on the first middle point and an angle between the reference direction and a direction from the first detected marker to the second detected marker;
calculating a position pointed to by the remote control based on a difference vector between the reference point and the second middle point; and
generating an image signal for an image based at least in part on the pointed-to position,
wherein the image sensor detects the first and sensor markers when the remote control points to a calibration pointing position during the calibration and the reference point is a middle point calculated based on the detecting of the first and second markers during the calibration.

12. An apparatus comprising: a processor; and memory configured to store computer readable instructions that, when executed, cause the processor to perform operations comprising setting a reference point and a reference direction based on a calibration for a remote control; receiving data indicative of first and second markers produced by a light source which are detected by an image sensor disposed on a front end portion of the remote control; calculating a first middle point based on the detecting of the first and second markers; calculating a second middle point based on the first middle point and an angle between the reference direction and a direction from the first detected marker to the second detected marker; calculating a position pointed to by the remote control based on a difference vector between the reference point and the second middle point; and generating an image signal for an image based at least in part on the pointed-to position, wherein the image sensor detects the first and second markers when the remote control points to a calibration pointing position during the calibration and the reference point is a middle point calculated based on the detecting of the first and second markers during the calibration.

13. A system comprising:
  a remote control configured to be held by a hand and comprising an image sensor for detecting first and second markers produced by a light source arranged in the vicinity of a display screen; and
  a processing system configured to set a reference point and a reference direction based on a calibration; calculate a first middle point based on the detecting of the first and second markers, calculate a second middle point based on the first middle position and an angle between the reference direction and a direction from the first detected marker to the second detected marker, calculate a position pointed to by the pointing device based on the difference vector between the reference point and the second middle point and generate image signals for an image displayed on the display screen based at least in part on the pointed-to position, wherein the image sensor detects the first and second markers when the remote control points to a calibration pointing position during the calibration and the reference point is a middle point calculated based on the detecting of the first and second markers during the calibration.

14. The system according to claim 13, wherein the remote further comprises a wireless transmitter for transmitting data indicative of the detected first and second markers.

* * * * *